United States Patent
Hirata et al.

(10) Patent No.: US 9,632,511 B2
(45) Date of Patent: Apr. 25, 2017

(54) PRESSURE TYPE FLOW CONTROL SYSTEM WITH FLOW MONITORING, AND METHOD FOR DETECTING ANOMALY IN FLUID SUPPLY SYSTEM AND HANDLING METHOD AT ABNORMAL MONITORING FLOW RATE USING THE SAME

(71) Applicant: FUJIKIN INCORPORATED, Osaka (JP)

(72) Inventors: Kaoru Hirata, Osaka (JP); Ryousuke Dohi, Osaka (JP); Kouji Nishino, Osaka (JP); Nobukazu Ikeda, Osaka (JP); Katsuyuki Sugita, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 247 days.

(21) Appl. No.: 14/075,890

(22) Filed: Nov. 8, 2013

(65) Prior Publication Data

US 2014/0230911 A1    Aug. 21, 2014

Related U.S. Application Data

(63) Continuation-in-part of application No. PCT/JP2012/002394, filed on Apr. 5, 2012.

(30) Foreign Application Priority Data

May 10, 2011 (JP) ................. 2011-105265

(51) Int. Cl.
*G05D 7/06* (2006.01)
*G01F 25/00* (2006.01)
(Continued)

(52) U.S. Cl.
CPC ............. *G05D 7/0623* (2013.01); *G01F 1/36* (2013.01); *G01F 1/363* (2013.01); *G01F 1/50* (2013.01);
(Continued)

(58) Field of Classification Search
CPC .. G05D 7/0617; G05D 7/0623; G05D 7/0635; G01F 1/36; G01F 1/363;
(Continued)

(56) References Cited

U.S. PATENT DOCUMENTS 4,393,013 A    7/1983   McMenamin
4,622,988 A    11/1986  Takimoto et al.
(Continued)

FOREIGN PATENT DOCUMENTS

JP    02-255595 A    10/1990
JP    5-102024 A     4/1993
(Continued)

OTHER PUBLICATIONS

Final Office Action issued in co-pending related U.S. Appl. No. 14/150,263 on Nov. 17, 2015.
(Continued)

*Primary Examiner* — William McCalister
(74) *Attorney, Agent, or Firm* — Griffin and Szipl PC

(57) ABSTRACT

A pressure type flow control system with flow monitoring includes an inlet, a control valve including a pressure flow control unit connected downstream of the inlet, a thermal flow sensor connected downstream of the control valve, an orifice installed on a fluid passage communicatively connected downstream of the thermal flow sensor, a temperature sensor provided near the fluid passage between the control valve and orifice, a pressure sensor provided for the fluid passage between the control valve and orifice, an outlet communicatively connected to the orifice, and a control unit including a pressure type flow rate arithmetic and control unit receiving a pressure signal from the pressure sensor and a temperature signal from the temperature sensor, and a flow sensor control unit to which a flow rate signal from the thermal flow sensor is input.

11 Claims, 28 Drawing Sheets

(51) Int. Cl.
  *G01F 1/36* (2006.01)
  *G01F 1/50* (2006.01)
  *G01F 1/684* (2006.01)
  *G01F 1/696* (2006.01)
  *G01F 5/00* (2006.01)
  *G01F 15/00* (2006.01)

(52) U.S. Cl.
  CPC .......... *G01F 1/6842* (2013.01); *G01F 1/6965* (2013.01); *G01F 5/00* (2013.01); *G01F 15/005* (2013.01); *G01F 25/0007* (2013.01); *G05D 7/0617* (2013.01); *G05D 7/0635* (2013.01); *Y10T 137/0368* (2015.04); *Y10T 137/7759* (2015.04); *Y10T 137/7761* (2015.04)

(58) Field of Classification Search
  CPC ........ G01F 1/50; G01F 1/6842; G01F 1/6965; G01F 5/00; G01F 15/005; G01F 25/0007; Y10T 137/7759; Y10T 137/7761
  USPC .............................................. 137/486, 487.5
  See application file for complete search history.

(56) References Cited

U.S. PATENT DOCUMENTS

| | | | | |
|---|---|---|---|---|
| 4,787,254 | A * | 11/1988 | Duckworth | G01F 1/42 73/861.62 |
| 5,288,325 | A | 2/1994 | Gomi | |
| 5,451,258 | A | 9/1995 | Hillman et al. | |
| 5,669,408 | A | 9/1997 | Nishino et al. | |
| 5,791,369 | A | 8/1998 | Nishino et al. | |
| 5,816,285 | A | 10/1998 | Ohmi et al. | |
| 5,865,205 | A * | 2/1999 | Wilmer | G05D 7/0635 137/2 |
| 6,119,710 | A * | 9/2000 | Brown | G01F 1/50 137/14 |
| 6,205,409 | B1 * | 3/2001 | Zvonar | G01F 25/00 137/486 |
| 6,210,482 | B1 | 4/2001 | Kitayama et al. | |
| 6,314,992 | B1 | 11/2001 | Ohmi et al. | |
| 6,539,968 | B1 * | 4/2003 | White | G05D 7/0635 137/10 |
| 6,656,282 | B2 | 12/2003 | Kim et al. | |
| 6,698,728 | B1 | 3/2004 | Ravetz et al. | |
| 7,833,353 | B2 | 11/2010 | Furukawahara et al. | |
| 2001/0013363 | A1 | 8/2001 | Kitayama et al. | |
| 2002/0174898 | A1 * | 11/2002 | Lowery | G05D 7/0635 137/487.5 |
| 2003/0072875 | A1 | 4/2003 | Sandhu | |
| 2004/0007180 | A1 | 1/2004 | Yamasaki et al. | |
| 2004/0144178 | A1 * | 7/2004 | Ohmi | G01D 3/022 73/708 |
| 2005/0173003 | A1 * | 8/2005 | Laverdiere | G05D 16/2013 137/487.5 |
| 2005/0221004 | A1 | 10/2005 | Kilpela et al. | |
| 2006/0008328 | A1 * | 1/2006 | Morgan | G05D 7/0647 406/10 |
| 2007/0254093 | A1 | 11/2007 | Nijhawan et al. | |
| 2008/0009978 | A1 * | 1/2008 | Smirnov | G05D 7/0635 700/282 |
| 2008/0220164 | A1 | 9/2008 | Bauch et al. | |
| 2009/0095068 | A1 * | 4/2009 | Redemann | G01F 1/6842 73/202 |
| 2009/0214779 | A1 | 8/2009 | Sarigiannis et al. | |
| 2009/0326719 | A1 | 12/2009 | Nagase et al. | |
| 2010/0012026 | A1 | 1/2010 | Hirata et al. | |
| 2010/0108154 | A1 | 5/2010 | Minami et al. | |
| 2010/0139775 | A1 * | 6/2010 | Ohmi | G05D 7/0635 137/12 |
| 2010/0178423 | A1 | 7/2010 | Shimizu et al. | |
| 2010/0192854 | A1 | 8/2010 | Nishino et al. | |
| 2010/0304567 | A1 | 12/2010 | Sakai et al. | |
| 2011/0100483 | A1 | 5/2011 | Nagata et al. | |
| 2011/0108126 | A1 * | 5/2011 | Monkowski | G05D 7/0635 137/12 |
| 2011/0265895 | A1 * | 11/2011 | Okabe | C23C 16/00 137/561 A |

FOREIGN PATENT DOCUMENTS

| | | |
|---|---|---|
| JP | 06-104155 A | 4/1994 |
| JP | 07-118862 A | 5/1995 |
| JP | 2000-066732 A | 3/2000 |
| JP | 2000-282242 A | 10/2000 |
| JP | 2000-323464 A | 11/2000 |
| JP | 2001-313288 A | 11/2001 |
| JP | 3291161 B2 | 6/2002 |
| JP | 2002-543589 A | 12/2002 |
| JP | 2003-013233 A | 1/2003 |
| JP | 2003-286573 A | 10/2003 |
| JP | 2003-323217 A | 11/2003 |
| JP | 2004-091917 A | 3/2004 |
| JP | 2004-246826 A | 9/2004 |
| JP | 2004-256864 A | 9/2004 |
| JP | 2005-149075 A | 6/2005 |
| JP | 2006-038832 A | 2/2006 |
| JP | 2007-095042 A | 4/2007 |
| JP | 2007-250803 A | 9/2007 |
| JP | 2008-010510 A | 1/2008 |
| JP | 4137666 B2 | 6/2008 |
| JP | 2009-059871 A | 3/2009 |
| JP | 2009-076807 A | 4/2009 |
| JP | 2009-226408 A | 10/2009 |
| JP | 2009-252760 A | 10/2009 |
| JP | 2010-153741 A | 7/2010 |
| JP | 2011-006782 A | 1/2011 |
| JP | 4605790 B2 | 1/2011 |
| JP | 2011-137235 A | 7/2011 |
| JP | 2001-258184 A | 9/2011 |
| WO | 00/65649 A1 | 11/2000 |
| WO | 01/42539 A1 | 6/2001 |
| WO | 2009/122646 A1 | 10/2009 |

OTHER PUBLICATIONS

International Search Report issued in application PCT/JP2012/001117, completed Apr. 2, 2012 and mailed Apr. 17, 2012.
http://www.massflow-online.com/faqs/what-do-lnmin-lsmin-slm-and-sccm-stand-for/ (2012)(downloaded Sep. 11, 2013).
English translation of the International Preliminary Report on Patentability issued in application PCT/JP2012/001117, mailed Apr. 17, 2012.
International Search Report issued in application PCT/JP2012/002395 completed Apr. 20, 2012 and mailed May 1, 2012.
English translation of the International Preliminary Report on Patentability issued in application PCT/JP2012/002395, on Nov. 13, 2013.
International Search Report issued in application PCT/JP2012/002394 completed Apr. 20, 2012 and mailed May 1, 2012.
English translation of the International Preliminary Report on Patentability issued in application PCT/JP2012/002394, on Nov. 13, 2013.
International Search Report issued in application PCT/JP2012/002832, completed Sep. 21, 2012 and mailed Oct. 2, 2012.
English translation of the International Preliminary Report on Patentability issued in application PCT/JP2012/002832 on Jan. 14, 2014.
"Standard Cubic Centimeters Per Minute," at http://www.allacronyms.com/SCCMstandard_cubic_centimeters_per_minute/213202 (downloaded Nov. 14, 2013).
"Tetraethyl Orthosilicate" (Air Products and Chemicals, Inc. 2012).
International Search Report issued in application PCT/JP2012/003783, completed Jul. 31, 2012 and mailed Aug. 7, 2012.
English translation of the International Preliminary Report on Patentability issued in application PCT/JP2012/003783, on Feb. 4, 2014.

(56) References Cited

OTHER PUBLICATIONS

International Search Report issued in application PCT/JP2012/004559, completed Aug. 6, 2012 and mailed Aug. 14, 2012.
Office Action issued in co-pending related U.S. Appl. No. 14/150,263 on Jun. 16, 2015.
Office Action issued in co-pending related U.S. Appl. No. 14/065,078 on Aug. 27, 2015.
Office Action issued in co-pending related U.S. Appl. No. 14/170,953, on May 13, 2016.
Office action issued Sep. 6, 2016 in co-pending related U.S. Appl. No. 14/170,953.
Office action issued Jul. 27, 2016 in co-pending related U.S. Appl. No. 14/343,226.
Office Action issued in co-pending U.S. Appl. No. 14/065,078 on Nov. 14, 2016.
Office Action issued in co-pending related U.S. Appl. No. 14/170,953 on Mar. 1, 2017.

* cited by examiner

Prior Art

Relationship between types of faults, genesis phenomena, and causes of occurrence at flow rate self-diagnosis

| [Diagnostic result] | [C: Causes of faults] | [B: Phenomena] | [A: Identification of faults] | [Types or anomaly outputs] | [Performance of flow rate self-diagnosis] | [Pressure drop characteristics] (Analysis of factor) |
|---|---|---|---|---|---|---|
| Anomaly of flow rate self-diagnosis | 1. Gas condition anomaly | 1.1. Flow rate defect | 1.1.1. Insufficient supply pressure | Check at "Flow Check Status" (Self-diagnosis is available) | Possible to detect anomaly at insufficient supply pressure for controlling flow rate of 100% (threshold value: 99% or less) | 4 |
| | | | 1.1.2. Fault of air-operation on primary side | Check at "Flow Check Status" (Self-diagnosis is available) | Possible to detect anomaly at insufficient supply pressure for controlling flow rate of 100% (threshold value: 99% or less) | 4 |
| | | | 1.1.3. Fault of air-operation on secondary side | [ALARM] at "Flow Check" (Self-diagnosis is available) | Possible to detect fault as diagnostic result | 2 |
| | | | 1.1.4. Outside leakage on secondary side | [ALARM] at "Flow Check" (Self-diagnosis is available) | Possible to detect fault as diagnostic result | 2 |
| | | | 1.1.5. Interfusion of gas at high F. F. | [ALARM] at "Flow Check" (Self-diagnosis is available) | Possible to detect fault as diagnostic result | 3 |
| | | | 1.1.6. Interfusion of gas at low F. F. | [ALARM] at "Flow Check" (Self-diagnosis is available) | Possible to detect fault as diagnostic result | 1 |
| | | | 1.1.7. Inappropriate zero input | [ALARM] at "Flow Check" (Self-diagnosis is available) | Diagnostic result of 1%/zero-point fluctuation of 0.5% FS both at standard pressure and low pressure | 3 |
| | 2. Fault of prefilter | 2.1. Insufficient flow rate | 2.1.1. Dust clogging | Check at "Flow Check Status" (Self-diagnosis is available) | Possible to detect anomaly at insufficient supply pressure for controlling flow rate of 100% (threshold value: 99% or less) | 4 |

FIG. 23
(a)
1.1.3 Pressure drop characteristics
in a case of fault of air-operation on secondary side
[Supply pressure at diagnosis: 300 kPaG, Gas used: $N_2$]
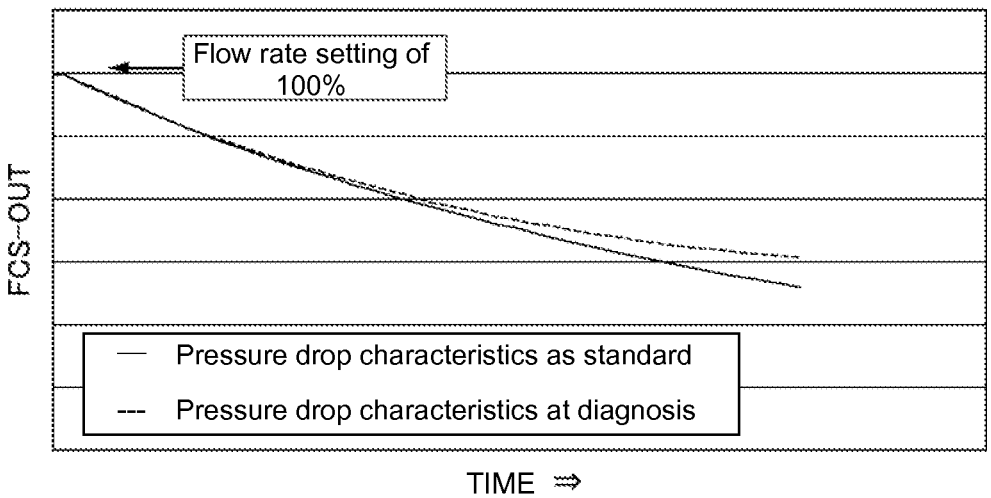
(b)
1.1.4 Pressure drop characteristics
in a case of outside leakage on secondary side
[Supply pressure at diagnosis: 300 kPaG, Gas used: $N_2$]
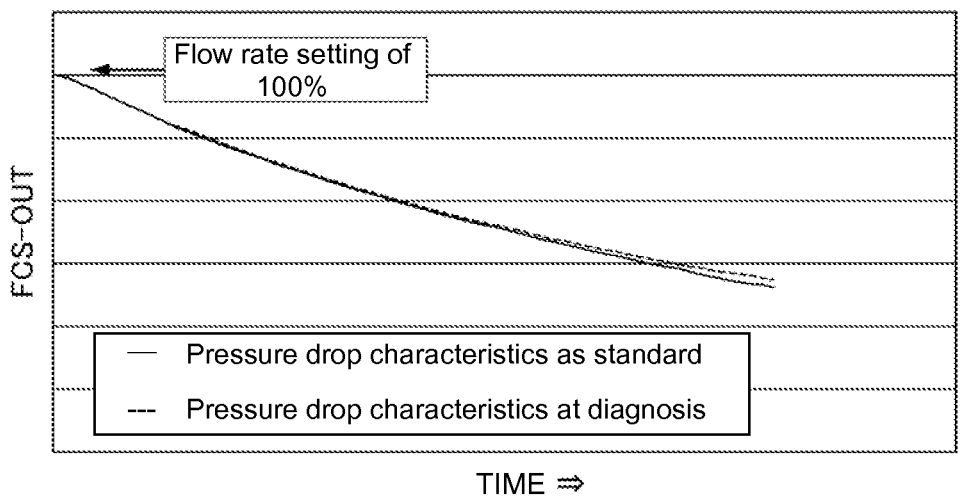

FIG. 24
(a)
1.1.5 Pressure drop characteristics
in a case of interfusion of gas at high F. F.
[Supply pressure at diagnosis: 300 kPaG, Gas used: $N_2$(He)]
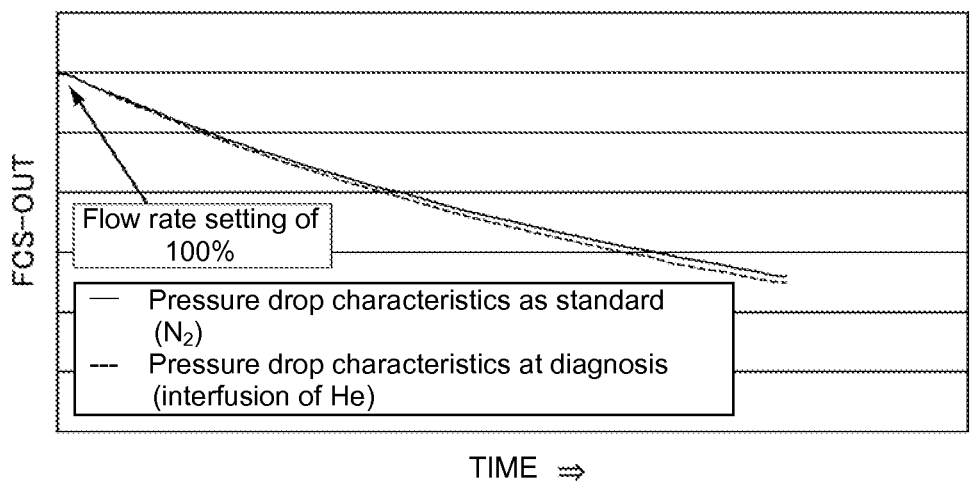
(b)
1.1.6 Pressure drop characteristics
in a case of interfusion of gas at low F. F.
[Supply pressure at diagnosis: 300 kPaG, Gas used: He($N_2$)]
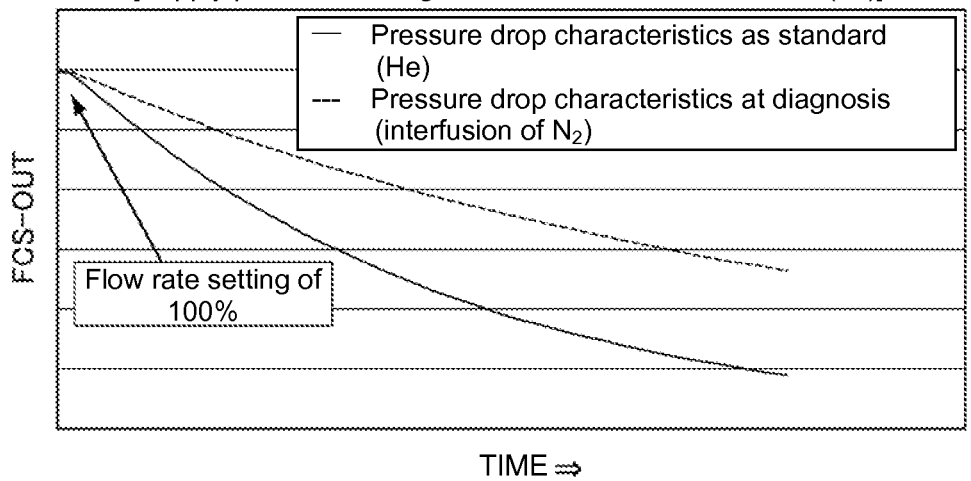

FIG. 25
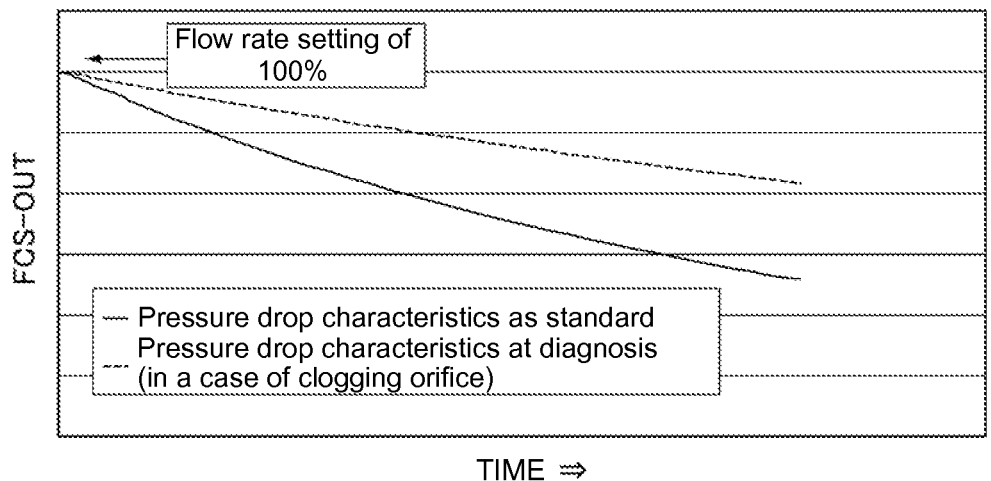
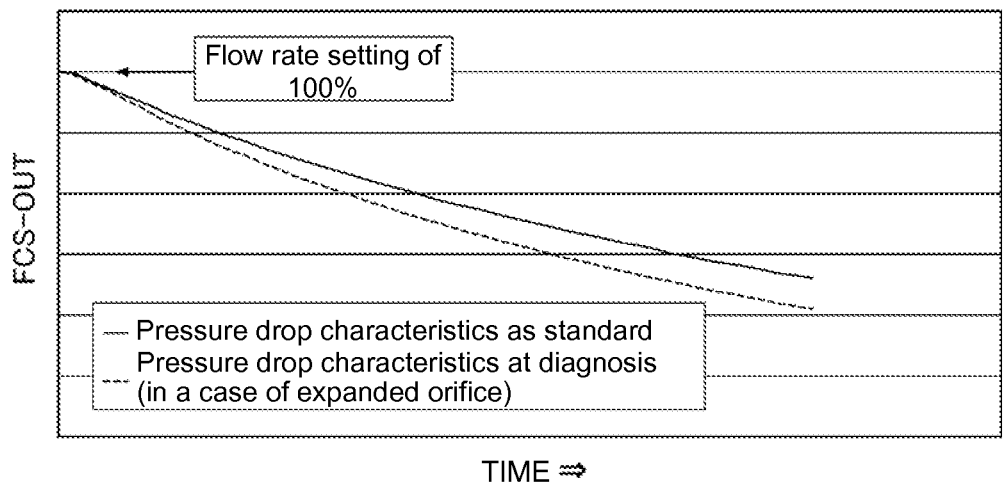

PRESSURE TYPE FLOW CONTROL SYSTEM WITH FLOW MONITORING, AND METHOD FOR DETECTING ANOMALY IN FLUID SUPPLY SYSTEM AND HANDLING METHOD AT ABNORMAL MONITORING FLOW RATE USING THE SAME

This is a Continuation-in-Part application in the United States of International Patent Application No. PCT/JP2012/002394 filed Apr. 5, 2012, which claims priority on Japanese Patent Application No. 2011-105265, filed May 10, 2011. The entire disclosures of the above patent applications are hereby incorporated by reference.

FIELD OF THE INVENTION

The present invention relates to an improvement in a pressure type flow control system and, in particular, to a pressure type flow control system with flow monitoring that is capable of monitoring a controlled flow rate of the pressure type flow control system in real-time operation by organically combining a thermal type mass flow sensor with the pressure type flow control system using an orifice, and a method for detecting an anomaly in a fluid supply system and a handling method when a monitoring flow rate is abnormal using the pressure type flow control system with flow monitoring.

(BACKGROUND OF THE INVENTION) DESCRIPTION OF THE RELATED ART

Conventionally, in a gas supply apparatus for a semiconductor control device, a pressure type flow control system FCS using an orifice has been widely used. This pressure type flow control system FCS is, as shown in FIG. 16, composed of a control valve CV, a temperature detector T, a pressure detector P, an orifice OL, an arithmetic and control unit CD, and the like, and the arithmetic and control unit CD is composed of a temperature correction/flow rate arithmetic circuit CDa, a comparison circuit CDb, an input-output circuit CDc, an output circuit CDd, and the like.

Detection values from the pressure detector P and the temperature detector T are converted into digital signals, to be input to the temperature correction/flow rate arithmetic circuit CDa, and a temperature correction and a flow rate computation are carried out therein, and a computed flow rate value Qt is input to the comparison circuit CDb. Furthermore, an input signal Qs as a set flow rate is input from a terminal In, to be converted into a digital value in the input-output circuit CDc, and the digital value is thereafter input to the comparison circuit CDb, to be compared with the computed flow rate value Qt from the temperature correction/flow rate arithmetic circuit CDa. Then, in the case where the set flow rate input signal Qs is higher than the computed flow rate value Qt, a control signal Pd is output to a drive unit of the control valve CV, and the control valve CV is driven in the opening direction. In fact, the control valve CV is driven in the valve-opening direction until a difference (Qs-Qt) between the set flow rate input signal Qs and the computed flow rate value Qt becomes zero.

The pressure type flow control system FCS itself is publicly known as described above. Moreover, the pressure type flow control system FCS is excellently characterized, in the case where the relationship that $P_1/P_2$ is greater than or equal to about 2 (i.e., so-called critical expansion conditions) is maintained between the downstream side pressure $P_2$ of the orifice OL (i.e., the pressure $P_2$ on the side of the process chamber) and the upstream side pressure $P_1$ of the orifice OL (i.e., the pressure $P_1$ on the outlet side of the control valve CV), by the flow rate Q of the gas Go flowing through the orifice OL, which becomes $Q=KP_1$ (however K is a constant). Thus, it is possible to highly accurately control the flow rate Q by controlling the pressure $P_1$, and the controlled flow rate value hardly changes even when the pressure of the gas Go on the upstream side of the control valve CV is greatly changed.

However, because the conventional pressure type flow control system FCS uses an orifice OL with a minute hole diameter, there may be a risk that the hole diameter of the orifice OL varies over time. As a result, there is a problem that a difference is caused between a controlled flow rate value determined by the pressure type flow control system FCS and a real flow rate of the gas Go actually flowing through the pressure type flow control system FCS. Consequently, it is necessary to frequently carry out so-called "flow monitoring" in order to detect this difference, which may highly influence the operating characteristics of semiconductor manufacturing equipment and the quality of manufactured semiconductors.

Therefore, conventionally, a flow control system that is capable of simply monitoring whether or not flow control is appropriately performed in real time has been developed in the fields of thermal type mass flow control systems and pressure type flow control systems. For example, FIG. 17 and FIG. 18 show one example thereof, and this mass flow control system (mass flow controller) 20 is composed of a flow passage 23, a first pressure sensor 27a for pressure on the upstream side, an opening/closing control valve 24, a thermal type mass flow sensor 25 that is installed on the downstream side of the opening/closing control valve 24, a second pressure sensor 27b that is installed on the downstream side of the thermal type mass flow sensor 25, a throttle unit (sonic nozzle) 26 that is installed on the downstream side of the second pressure sensor 27b, an arithmetic and control unit 28a, an input-output circuit 28b, and the like.

The thermal type mass flow sensor 25 has a rectifier body 25a that is inserted into the flow passage 23, a branched flow passage 25b that is branched from the flow passage 23 so as to have only a flow rate of F/A, and a sensor main body 25c that is installed on the branched flow passage 25b, and outputs a flow rate signal Sf denoting a total flow rate F. Furthermore, the throttle unit 26 is a sonic nozzle that flows a fluid at a flow rate corresponding to the pressure on the primary side when a pressure difference between those on the primary side and the secondary side is higher than or equal to a predetermined value. In addition, in FIG. 17 and FIG. 18, reference symbols Spa and Spb are pressure signals, reference symbols Pa and Pb are pressure, reference symbol F is a flow rate, reference symbol Sf is a flow rate signal, and reference symbol Cp is a valve opening degree control signal.

The arithmetic and control unit 28a employs the pressure signals Spa and Spb from the pressure sensors 27a and 27b, respectively, and the flow control signal Sf from the flow sensor 25, to output the valve opening degree control signal Cp as a feedback, thereby performing feedback control of the opening/closing valve 24. In other words, the flow rate setting signal Fs is input to the arithmetic and control unit 28a via the input-output circuit 28b, and the flow rate F of the fluid flowing in the mass flow control system 20 is regulated so as to correspond to the flow rate setting signal Fs. In detail, the arithmetic and control unit 28a provides feed back to the opening/closing control valve 24 by use of an output Cp (which is based on the pressure signal Spb from the second pressure sensor 27b), to control the opening or closing of the opening/closing control valve 24, thereby controlling the flow rate F of the fluid flowing in the sonic nozzle 26. Furthermore, the arithmetic and control unit 28a makes use of measurement of the actual flowing flow rate F by use of an output (i.e., the flow rate signal Sf) from the thermal type flow sensor 25, in order to check the operation of the mass flow control system 20.

Thus, in the mass flow control system 20 of the apparatus model shown in FIG. 17 and FIG. 18, because two types of measurement methods of pressure type flow measurement, using the second pressure sensor 27b for performing flow control and a flow measurement using the thermal type flow sensor 25 for monitoring a flow rate, are incorporated in the arithmetic and control unit 28a, it is possible to easily and reliably monitor whether or not a fluid at a controlled flow rate (i.e., a set flow rate $F_S$) is actually flowing. That is, it is possible to easily and reliably monitor whether or not there is a difference between the controlled flow rate (the goal flow rate) and the real flow rate (the actual flow rate), which exerts a high practical effect.

However, there remain many problems to be solved in the mass flow control system 20 shown in FIG. 17 and FIG. 18. As a first problem to address, the arithmetic and control unit 28a is configured to control the opening and closing of the opening/closing control valve 24 by use of both signals of the output Spb from the second pressure sensor 27b and the flow rate output Sf from the thermal type flow sensor 25, and to correct the flow rate output Sf from the thermal type flow sensor 25 by use of the output Spa from the first pressure sensor 27a. In other words, the arithmetic and control unit 28a controls the opening and closing of the opening/closing control valve 24 by use of these three signals, namely, two pressure signals from the first pressure sensor 27a and the second pressure sensor 27b, respectively, and a flow rate signal from the thermal type flow sensor 25. Therefore, there is a problem that not only is the configuration of the arithmetic and control unit 28a complicated, but also stable flow control characteristics and excellently high response characteristics of the pressure type flow control system FCS are reduced by opposite factors.

As a second problem to address, there is a problem in that the installation position of the thermal type flow sensor 25, with respect to the opening/closing control valve 24, is changed. That is, in the mass flow control system 20 shown in FIG. 17 and FIG. 18, the response characteristics of the thermal type flow sensor 25 at the time of opening and closing of the opening/closing control valve 24, and the gas replacement characteristics and the vacuuming characteristics in the device main body, are greatly changed. Consequently, it is difficult to downsize the mass flow control system 20.

Furthermore, so-called "flow control" systems have been widely used for gas supply devices, and the like, in semiconductor manufacturing facilities as shown in, for example, FIG. 31. As shown in FIG. 31, a purge gas supply system Y and a process gas supply system X are connected in parallel on the upstream side of a flow control system D, and a process gas using system C is connected on the downstream side of the flow control system D. Moreover, valves $V_1$, $V_2$, and $V_3$ are respectively installed along the way of the respective gas supply systems X and Y and the gas using system C.

In addition, in the fluid supply system as shown in FIG. 31, generally, the operating statuses of the valves $V_1$ to $V_3$ are periodically inspected, and this inspection work is absolutely imperative in order to stably supply a required process gas through the process gas using system C. Therefore, in the above-described inspections (hereinafter called checks) for the valves $V_1$ to $V_3$, usually, checks for the operating states of the respective valves (including the operation of a valve actuator) and checks for seat leakages of the respective valves, are carried out.

However, at the time of checks for the seat leakages of the valve $V_3$ of the process gas using system C, and for the valves $V_1$ and $V_2$ on the upstream side of the flow control system D, it is necessary to detach the respective valves $V_1$, $V_2$ and $V_3$ from the pipe passages, so that each valve can be checked by use of a separately provided test device. However, this takes a lot of time and effort to perform these seat leakage checks for the respective valves.

The problems relating to these inspections for the respective valves are the same as those in the pressure type flow control system with flow monitoring. That is, every time an anomaly in monitoring flow rate is detected by a flow rate self-diagnostic mechanism, it is necessary to detach the pressure type flow control system with flow monitoring from the pipe passage to inspect it, which is a problem because it takes a lot of time and effort.

CITATION LIST

Patent Document

Patent Document 1: Japanese Patent No. 4137666; and
Patent Document 2: Japanese Published Unexamined Patent Application No. 2007-95042.

PROBLEMS TO BE SOLVED BY THE INVENTION

The present invention has been made to solve the aforementioned problems in the mass flow control system that uses a sonic nozzle, such as described in Japanese Patent No. 4137666 shown in FIG. 17 and FIG. 18. That is, because the opening and closing of the opening/closing control valve 24 is controlled by use of two types of different signals of pressure signals from the first and second pressure sensors 27a and 27b and a flow rate signal from the thermal type flow sensor 25, in order to solve the problems that (i) not only is the configuration of the arithmetic and control unit 28a complicated, but (ii) also excellently high response characteristics and stable flow control characteristics that the pressure type flow control system may have might be diminished, it is unavoidable that the mass flow control system 20 grows to a large side. Consequently, the gas replacement characteristics are deteriorated and vacuuming operations take a long time, and the like. Thus, it is an object of the present invention to provide a pressure type flow control system with flow monitoring in which the flow control unit of a pressure type flow control system FCS using an orifice, and a thermal type flow monitoring unit using a thermal type flow sensor, are integrally combined so as to independently carry out flow control and flow monitoring respectively. In this way, the pressure type flow control system with flow monitoring is able to make full use of the excellent flow characteristics of the pressure type flow control system, and is able to carry out flow monitoring by the thermal type flow sensor in a real-time manner. Additionally, the pressure type flow control system with flow monitoring is capable of simplifying its arithmetic and control unit, improving the gas replacement characteristics by drastically downsizing the device main body part, and the like.

Furthermore, the present invention has been made to solve the problem that it is necessary to detach the respective valves from the pipe passages at the time of seat leakage checks, and the like, for the valves installed on the upstream side and the downstream side of the pressure type flow control system with flow monitoring. Such detachment of the valves from the pipe passages takes a lot of time and effort to perform seat leakage checks, and the like, and this causes the problem that, even in the case where an anomaly in monitoring flow rate is detected by the flow rate self-diagnostic mechanism, which is provided in the pressure type flow control system with flow monitoring, it is not possible to swiftly figure out the cause of the anomaly occurrence, and to adopt a necessary countermeasure, for example. Consequently, it is difficult to determine whether or not when it is required to replace the pressure type flow control system with flow monitoring itself. Thus, it is an object of the present invention to provide a method for detecting an anomaly in a fluid supply system, and a handling method, when a monitoring flow rate is abnormal when using a pressure type flow control system with flow monitoring, wherein these methods are capable of simply and swiftly carrying out seat leakage checks for valves, and swiftly making an accurate response when the monitoring flow rate is abnormal.

MEANS FOR SOLVING THE PROBLEMS

The inventors of the invention of the present application have devised a pressure type flow control system with flow monitoring that is first based on a pressure type flow control system using an orifice, so as to use orifices of two configurations as shown in the dotted frames of FIG. 6 and FIG. 7, in order to carry out flow monitoring in real time. In FIG. 6 and FIG. 7, reference symbol 1 denotes a pressure type flow control system with flow monitoring, reference symbol 2 denotes a thermal type flow sensor, reference symbol 3 denotes a control valve, reference symbol 4 denotes a temperature sensor, reference symbol 5 denotes a pressure sensor, reference symbol 6 denotes an orifice, reference symbol 7 denotes a control unit, reference symbol 8 denotes an inlet side flow passage, reference symbol 9 denotes an outlet side flow passage, and reference symbol 10 denotes a fluid passage in a device main body. As evident from the drawings, the pressure type flow control system with flow monitoring in which the installation positions of the thermal type flow sensor 2 and the control valve 3 shown in FIG. 6 are exchanged, or switched, corresponds to the pressure type flow control system with flow monitoring illustrated in FIG. 7.

In addition, the reason that the pressure type flow control system, using an orifice, is employed in a flow control method is that the flow control characteristics of such a system are advantageous, with a long record of use, and the like. Furthermore, the reason that the thermal type flow sensor 2 is used as a sensor for flow monitoring is mainly because of its flow rate, and its record of use as a sensor, and the excellent characteristics it has a flow sensor, and the result of consideration of the point that the ease of real-time measurement, the responsiveness to a change of gas type, the accuracy of flow rate measurement, the record of use, and the like, are better than those of other flow rate measurement sensors. Moreover, the reasons that the thermal type flow sensor 2 is integrally assembled in the fluid passage 10 in the device main body of the pressure type flow control system using the orifice is that it is easy to carry out flow monitoring, and it is easy to downsize the pressure type flow control system with flow monitoring.

In other words, the pressure type flow control system 1 with flow monitoring using an orifice, having the configurations shown in FIG. 6 and FIG. 7, is a pressure control type flow system that is characterized by that, for example, it is free of the influence of a supply pressure fluctuation. Furthermore, it is possible, with the pressure type flow control system 1 with flow monitoring using an orifice, to sense an anomaly of the orifice by utilizing the pressure drop characteristics on the upstream side of the orifice, and it is possible to monitor supply pressure with the pressure sensors built-in the device main body, and it is possible to continuously monitor the flow rate with the thermal sensor.

On the other hand, as residual problems, first, an output fluctuation of the thermal type flow sensor due to a change in supply pressure may be forseen. That is, because output from the thermal type flow sensor fluctuates due to change in supply pressure, an error from a controlled flow rate may be caused at the time of changing supply pressure. Therefore, a response, such as easing the output fluctuation due to changes in supply pressure by delaying the response characteristics of the thermal type flow sensor, is required.

A second residual problem is directed to conditions at the time of zero point adjustment. Generally, a zero point adjustment is executed under vacuuming in a pressure sensor, and is executed in the sealing state in the flow sensor. Accordingly, it is necessary to protect these sensors so as not to execute a zero point adjustment under wrong conditions.

A third residual problem is related to a thermal siphon phenomenon of the thermal type flow sensor. That is, it is necessary to determine an installing direction in advance of mounting of the thermal type flow sensor and, as a result, it is necessary to review an installing direction of the pressure type flow control system with flow monitoring concurrently with the design of a gas box.

A fourth residual problem is related to calibration of a live gas flow rate. Generally, in flow rate measurement, an output value of the thermal type flow sensor varies, even at the same flow rate, according to a gas type. As a result, it is necessary to add a system that automatically computes a conversion factor (i.e., a CF value) of the thermal type flow sensor at the site using the pressure type flow control system with flow monitoring.

A fifth residual problem is directed to a response when the controlled flow rate is abnormal. In a current pressure type flow control system, an alarm and an error in controlled flow rate, and the like, are indicated on a display. At the same time, a system that judges the controlled flow rate as abnormal, when an output difference between monitored flow rates of the pressure type flow control system and the thermal type flow sensor exceeds a predetermined threshold value, is required.

As a result, first, the inventors of the invention of the present application have conducted evaluation tests for various types of characteristics with respect to the thermal type flow sensor 2, which is newly incorporated in the respective pressure type flow control systems with flow monitors of FIG. 6 and FIG. 7.

That is, as shown in FIG. 6 and FIG. 7, a fluid supply source 11 formed of an $N_2$ container, a pressure regulator 12, a purge valve 13, and an inlet side pressure sensor 14, are connected to the inlet side flow passage 8, and a data logger (NR500) 15 is connected to the control unit 7. Moreover, a characteristics evaluation system that performs vacuuming of the outlet side flow passage 9 by using a vacuum pump 16 is configured, and the step response characteristics of the thermal type flow sensor 2, the monitoring flow rate accuracy, the supply pressure fluctuating characteristics, and the repetitive reproducibility, are evaluated by use of this characteristics evaluation system.

The above-described step response characteristics are evaluated as response characteristics of thermal type flow sensor outputs to step inputs set at predetermined flow rates, and output responses, in the case where the set flow rate is changed in steps from 100% (full scale) F. S.=1000 (sccm) to 20%, 50% and 100%, are evaluated. Here, the abbreviation "sccm" stands for standard cubic centimeter per minute. FIG. 8, FIG. 9 and FIG. 10 show the measurement results of a flow rate setting input $A_1$ of the pressure type flow control system 1 and a flow rate output $A_2$ at that time, a thermal type flow sensor output $B_1$ (in the case of FIG. 6), and a thermal type flow sensor output $B_2$ (in the case of FIG. 7), in the data logger 15 in the case where the set flow rates are 20%, 50% and 100%, respectively.

As is also clear from FIG. 8 to FIG. 10, it has been confirmed by the inventors that the outputs from the thermal type flow sensor 2 converge within ±2% of the set output within about 4 seconds from the start of the setting.

The monitoring flow rate accuracy has also been measured and evaluated as amounts of changes in thermal type flow sensor outputs when a set value is shifted in units of S. P. (set points) from the respective flow rate settings, and the error setting conditions are −0.5% S. P., −1.0% S. P., −2.0% S. P., and −3.0% S. P.

As is also clear from FIG. 11 and FIG. 12, it has become apparent that the monitoring flow rate accuracy of the thermal type flow sensor 2 changes in units of set points (S. P.) according to the flow rate setting.

The supply pressure fluctuating characteristics show a fluctuating state of thermal type flow sensor outputs, in the case where supply pressure is fluctuated while controlling at a constant flow rate, and have been measured with a flow rate setting of 50% and a fluctuation condition of supply pressure of 50 kPaG.

FIG. 13 shows the measurement results thereof, and it has become apparent that, in the case where the thermal type flow sensor 2 is set on the upstream side (primary side) of the control valve 3 (in the case of FIG. 6), the change in flow rate output from the thermal type flow sensor 2 due to a fluctuation in supply pressure exceeds a range of ±0.5% F. S./div by far. On the other hand, in the case where the thermal type flow sensor 2 is set on the downstream side (secondary side) of the control valve 3 (in the case of FIG. 7), the change in flow rate output diverges within the range of ±0.5% F. S./div. Consequently, the thermal type flow sensor 2 is less likely to be influenced by a fluctuation in gas supply pressure when the thermal type flow sensor 2 is set on the downstream side (secondary side) of the control valve 3 (in the case of FIG. 7).

The repetitive reproducibility has been measured as reproducibility of the thermal type flow sensor outputs $B_1$ and $B_2$ by repetitively inputting a flow rate from 0% to the set flow rates when the set flow rate is set to 20% and 100%, respectively.

As is also clear from FIG. 14 and FIG. 15, it has become apparent that the repetitive reproducibility of the thermal type flow sensor outputs is within the ranges of ±1% F. S. and ±0.2% F. S. Thus, regular and precise reproducibility has been shown.

In addition, the thermal type flow sensors 2, used in the systems of FIG. 6 and FIG. 7, are sensors mounted in the FCS-T1000 series manufactured by Fujikin Incorporated. These sensors are used widely as thermal type flow sensors for a so-called "thermal type mass flow control system" (mass flow controller).

From the results of the respective evaluation tests (i.e., the step response characteristics, the monitoring flow rate accuracy characteristics, the supply pressure fluctuating characteristics, and the repetitive reproducibility characteristics), on the basis of FIG. 6 and FIG. 7 with respect to the thermal type flow sensor 2, the inventors of the invention of the present application have found that there are no relative merits whether the installation position of the thermal type flow sensor 2 is on the upstream side (primary side), or on the downstream side (secondary side) of the control valve 3, from the viewpoint of the step response characteristics, the monitoring flow rate accuracy characteristics, and the repetitive reproducibility characteristics. On the other hand, the thermal type flow sensor 2 is preferably installed on the downstream side (secondary side) of the control valve 3 of the pressure type flow control system (that is, it preferably has the configuration of FIG. 7) from the viewpoint of the supply pressure fluctuating characteristics, which are better at this location.

Furthermore, the inventors have found that, in the case where the thermal type flow sensor 2 is installed on the downstream side (secondary side) of the control valve 3, the content volume between the control valve 3 and the orifice 6 is increased. This increase in content volume is responsible for deteriorating the gas replacement characteristics, and delaying the pressure drop characteristics (i.e., deteriorating the outgassing characteristics), in the case of a low flow rate type pressure type flow control system, and these points, or the like, become problems.

SUMMARY OF THE INVENTION

The present invention has been created based on the results of the above-described respective evaluation tests by the inventors of the invention of the present application. Thus, in accordance with a first embodiment of the present invention, the indispensable constituent features of the invention include an inlet side passage 8 for fluid, a control valve 3 composing a pressure type flow control unit $1a$ that is connected to a downstream side of the inlet side passage 8, a thermal type flow sensor 2 that is connected to a downstream side of the control valve 3, an orifice 6 that is installed along the way of a fluid passage 10 communicatively connected to a downstream side of the thermal type flow sensor 2, a temperature sensor 4 that is provided near the fluid passage 10 between the control valve 3 and the orifice 6, a pressure sensor 5 that is provided for the fluid passage 10 between the control valve 3 and the orifice 6, an outlet side passage 9 that is communicatively connected to the orifice 6, and a control unit 7 that is composed of a pressure type flow rate arithmetic and control unit $7a$ to which a pressure signal from the pressure sensor 5 and a temperature signal from the temperature sensor 4 are input, and computes a flow rate value Q of a fluid flowing through the orifice 6, and outputs a control signal Pd for bringing the control valve 3 into an opening or closing action in a direction in which a difference between the computed flow rate value and a set flow rate value is decreased, to a valve drive unit $3a$, and a flow sensor control unit $7b$ to which a flow rate signal $2c$ from the thermal type flow sensor 2 is input, and computes a flow rate of the fluid flowing through the orifice 6 according to the flow rate signal $2c$, to indicate the flow rate.

In accordance with a second embodiment of the present invention, in the invention according to the first embodiment, the pressure sensor 5 is provided between the outlet side of the control valve 3 and the inlet side of the thermal type flow sensor 2.

In accordance with a third embodiment of the present invention, in the invention according to the first embodiment or the second embodiment, when the difference between the flow rate of the fluid computed by the flow sensor control unit 7b and the flow rate of the fluid computed by the pressure type flow rate arithmetic and control unit 7a exceeds a set value, then a control unit 7 performs an alarm indication.

In accordance with a fourth embodiment of the present invention, in the invention according to the first embodiment, the control valve 3, the thermal type flow sensor 2, the orifice 6, the pressure sensor 5, the temperature sensor 4, the inlet side passage 8, and the outlet side passage 9, are integrally assembled in one body, and the fluid passage 10 is integrally formed in this one body.

In accordance with a fifth embodiment of the present invention, the indispensable constituent features of the invention include an inlet side passage for fluid 8, a control valve 3 composing a pressure type flow control unit 1a that is connected to a downstream side of the inlet side passage 8, a thermal type flow sensor 2 that is connected to a downstream side of the control valve 3, an orifice 6 that is installed along the way of a fluid passage 10 communicatively connected to a downstream side of the thermal type flow sensor 2, a temperature sensor 4 that is provided near the fluid passage 10 between the control valve 3 and the orifice 6, a pressure sensor 5 that is provided for the fluid passage 10 between the control valve 3 and the orifice 6, an outlet side passage 9 that is communicatively connected to the orifice 6, a pressure sensor 17 that is provided for the outlet side passage 9 on the downstream side of the orifice 6, and a control unit 7 that is composed of a pressure type flow rate arithmetic and control unit 7a to which pressure signals from the pressure sensor 5 and the pressure sensor 17 and a temperature signal from the temperature sensor 4 are input, and monitors critical expansion conditions of a fluid flowing through the orifice 6 and computes a flow rate value Q of the fluid flowing through the orifice 6, and outputs a control signal Pd for bringing the control valve 3 into an opening or closing action in a direction in which a difference between the computed flow rate value and a set flow rate value is decreased, to a valve drive unit 3a, and a flow sensor control unit 7b to which a flow rate signal 2c from the thermal type flow sensor 2 is input, and computes a flow rate of the fluid flowing through the orifice 6 according to the flow rate signal 2c, to indicate the flow rate.

In accordance with a sixth embodiment of the present invention, in the fifth embodiment of the invention, the control unit 7 performs an alarm indication when the fluid flowing through the orifice 6 is out of the critical expansion conditions.

In accordance with a seventh embodiment of the present invention, in the fifth embodiment of the invention, the control valve 3, the thermal type flow sensor 2, the orifice 6, the pressure sensor 5, the temperature sensor 4, the inlet side passage 8, the outlet side passage 9, and the pressure sensor 17, are integrally assembled in one body.

In accordance with an eighth embodiment of the present invention, a basic configuration of the invention includes detecting anomalies of valves installed on the upstream side and/or the downstream side of the pressure type flow control system with flow monitoring in a fluid supply system equipped with a pressure type flow control system with flow monitoring, having a pressure sensor that is composed of a flow rate setting mechanism, a flow rate and pressure indicating mechanism, and/or a flow rate self-diagnostic mechanism, In this embodiment, anomalies are detected by use of an indicated value of pressure in the pressure type flow control system with flow monitoring, and/or a diagnosed value of the flow rate self-diagnostic mechanism, and in which valves intended for anomaly detection are a valve of a purge gas supply system and a valve of a process gas supply system that are installed on the upstream side of the pressure type flow control system with flow monitoring, and a valve that is installed in a process gas using system on the downstream side of the pressure type flow control system with flow monitoring, and the type of anomaly to be detected is an opening and closing operational anomaly and a seat leakage of a valve.

In accordance with a ninth embodiment of the present invention, in the eighth embodiment of the invention, the flow rate self-diagnostic mechanism of the pressure type flow control system with flow monitoring is a mechanism that is configured to compare initial set pressure drop characteristics and pressure drop characteristics at diagnosis, in order to diagnose an anomaly, and to detect a seat leakage in the valve of the process gas supply system or the purge gas supply system from a change in the diagnosed value when a mixed gas of a process gas and a purge gas flows in.

In accordance with a tenth embodiment of the present invention, a basic configuration of the invention includes detecting anomalies of valves installed in the pressure type flow control system with flow monitoring, and on the upstream side and/or the downstream side of the pressure type flow control system with flow monitoring in a fluid supply system equipped with a pressure type flow control system with flow monitoring, having a pressure sensor that is composed of a flow rate setting mechanism, a flow rate and pressure indicating mechanism, and/or a flow rate self-diagnostic mechanism. In this embodiment, anomalies are detected by use of an indicated value of pressure in the pressure type flow control system with flow monitoring and/or the flow rate self-diagnostic mechanism, wherein the flow rate self-diagnostic mechanism of the pressure type flow control system with flow monitoring is a mechanism that is configured to compare initial set pressure drop characteristics and pressure drop characteristics at diagnosis, to diagnose an anomaly, and it is judged or ascertained, as compared with the pressure drop characteristics at the initial setting, which pattern of (I) a pressure drop starts delaying immediately after the diagnosis, (II) a pressure drop starts delaying in the process of the diagnosis, (III) a pressure drop starts accelerating immediately after the diagnosis, and (IV) the pressure at the start of the diagnosis does not reach the pressure at the initial setting corresponds to the pressure drop characteristics at flow rate self-diagnosis by the flow rate self-diagnostic mechanism, in order to determine a cause of the detected anomaly from the judged pattern or ascertained pattern of the pressure drop characteristics at flow rate self-diagnosis.

In accordance with an eleventh embodiment of the present invention, performing a flow rate self-diagnosis by use of the method for detecting an anomaly in the fluid supply system according to the tenth embodiment, checking a shift in zero-point of the pressure sensor after determining a cause of an anomaly detected from a pattern of the pressure drop characteristics at flow rate self-diagnosis, again performing a flow rate self-diagnosis after adjusting the zero-point when the zero-point is shifted, judging or ascertaining whether or not the determined cause of the anomaly is an anomaly in the fluid supply system in the case where there is no shift in the zero-point, restoring the anomaly in the fluid supply system in the case where the fluid supply system is abnormal, and judging or ascertaining that the pressure type flow control system with flow monitoring itself is abnormal, to replace the system in the case where there is no anomaly in the fluid supply system.

In accordance with a twelfth embodiment of the present invention, performing a flow rate self-diagnosis by use of the method for detecting an anomaly in the fluid supply system in the tenth embodiment of the present invention, and in the case where a monitoring flow rate is abnormal due to a change in diameter of the orifice of the pressure type flow control system with flow monitoring, carrying out calibration for the pressure type flow control system with flow monitoring so as to consider the monitoring flow rate as correct.

EFFECT OF THE INVENTION

In the present invention, the pressure type flow control system with flow monitoring is formed of the pressure type flow control unit 1a and the thermal type flow monitoring unit 1b, and the thermal type flow sensor 2 of the thermal type flow monitoring unit 1b is located on the downstream side of the control valve 3, to be organically integrated, and the control unit 7 is configured by integrating the pressure type flow rate arithmetic and control unit 7a that controls driving of opening and closing of the control valve 3 of the pressure type flow control unit 1a, and the flow sensor control unit 7b that computes a real flow rate of fluid flowing through the orifice 6 with a flow rate signal from the thermal type flow sensor 2, and indicates the real flow rate, wherein the real flow rate and the flow rate signal are independent of each other.

As a result, with the control unit 7 having a simple configuration, it is possible to easily and precisely perform stable pressure type flow control, and it is also possible to continuously and precisely carry out flow monitoring by the thermal type flow sensor 2 in real time.

Furthermore, because of the configuration in which the thermal type flow sensor 2 is located on the downstream side of the control valve 3, and the respective device main bodies, such as the control valve 3 and the thermal type flow sensor 2 are integrally assembled in one body, the internal space volumes of the device main bodies are not considerably reduced, which does not deteriorate the characteristics of the gas replacement characteristics and the vacuuming characteristics. Moreover, even when there is a fluctuation in fluid pressure on the side of the fluid supply source, a great fluctuation is not caused in the output characteristics of the thermal type flow sensor 2. As a result, it is possible to perform stable flow monitoring and flow control with respect to the fluctuation in pressure on the side of the fluid supply source.

In the present invention, by use of the pressure type flow control system with flow monitoring itself, which is incorporated in the gas supply system, it is possible to extremely easily and precisely check anomalies of opening and closing operations and seat leakages in the valves in the gas supply system, an anomaly in zero-point of the pressure type flow control system with flow monitoring, and the like, without detaching the respective valves from the pipe passages.

Furthermore, in accordance with the present invention, in the case where a seat leakage in a valve or an operational anomaly in a valve, or an anomaly of zero-point of the pressure type flow control system with flow monitoring, is caused, it is possible to precisely identify and judge or determine a cause of the anomaly occurrence according to a pattern of the pressure drop characteristic curve. This makes it possible to more efficiently carry out repair and adjustment for the necessary devices, and the like.

Moreover, in accordance with the present invention, in the case where an anomaly in the monitoring flow rate is caused by a change in diameter of the orifice of the pressure type flow control system with flow monitoring, it is possible to swiftly calibrate the pressure type flow control system with flow monitoring so as to consider the monitoring flow rate as correct.

In addition, in accordance with the present invention, because it is possible to detect a seat leakage anomaly, and to automatically compute and indicate its leakage quantity within a short time, it is possible to precisely and swiftly judge or determine whether or not to continue to drive the devices and apparatuses, and the like, and the influence by the occurrence of the seat leakage. Thus, it is possible to easily determine the necessity of replacement of the pressure type flow control system with flow monitoring itself.

BRIEF DESCRIPTION OF THE DRAWINGS

FIG. 23(a) shows a representative example of pressure drop characteristics as graphed in the event of a fault of a driving mechanism of an air-operated valve on the secondary side.

FIG. 23(b) shows a representative example of pressure drop characteristics as graphed in the case where there is a leakage from the outside to the secondary side.

FIG. 24(a) shows a representative example of pressure drop characteristics as graphed in the case where gas at a high flow factor is mixed in.

FIG. 24(b) shows a representative example of pressure drop characteristics as graphed in the case where gas at a low flow factor is mixed in.

FIG. 25(a) shows a representative example of pressure drop characteristics as graphed in the case where an orifice is clogged.

FIG. 25(b) shows a representative example of pressure drop characteristics as graphed in the case where the orifice expands.

DETAILED DESCRIPTION OF THE PREFERRED EMBODIMENTS

Figure 1:
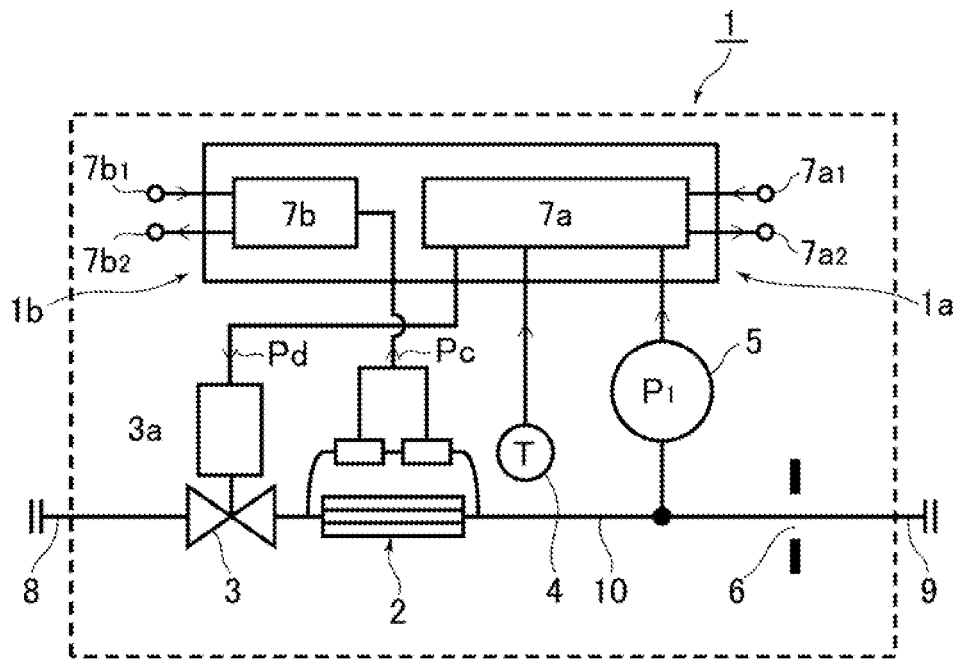
FIG. 1 is a schematic diagram of a configuration of a pressure type flow control system with flow monitoring utilizing an orifice according to an embodiment of the present invention.

Hereinafter, an embodiment of a pressure type flow control system with flow monitoring, according to the present invention, will be described with reference to the drawings. In the drawings, like parts are designated by like character references. FIG. 1 is a schematic diagram of a configuration according to an embodiment of a pressure type flow control system 1 with flow monitoring according to the present invention. The pressure type flow control system 1 with flow monitoring is composed of a pressure type flow control unit 1a and a thermal type flow monitoring unit 1b.

Furthermore, the pressure type flow control unit 1a is composed of a control valve 3a, a temperature sensor 4, a pressure sensor 5, an orifice 6, and a pressure type flow rate arithmetic and control unit 7a forming a component of a control unit 7.

Moreover, the thermal type flow monitoring unit 1b is composed of a thermal type flow sensor 2 and a flow sensor control unit 7b forming another component of the control unit 7.

The pressure type flow control unit 1a, as described above, is composed of the control valve 3, the temperature sensor 4, the pressure sensor 5, the orifice 6, the pressure type flow rate arithmetic and control unit 7a, and the like, and a flow rate setting signal is output from an input terminal $7a_1$, and a flow rate output signal of a fluid flowing through the orifice, which has been computed by the pressure type flow control unit 1a, is output from an output terminal $7a_2$.

The pressure type flow control unit 1a itself, which uses the orifice 6, is a publicly-known technique as evident from Japanese Patent No. 3291161, and the like, and computes a flow rate of fluid flowing through the orifice 6 under the critical expansion conditions on the basis of pressure detected by the pressure detection sensor 5, with the pressure type flow rate arithmetic and control unit 7a, and outputs a control signal Pd proportional to a difference between the set flow rate signal input from the input terminal $7a_1$ and the computed flow rate signal outputted to a valve drive unit 3a of the control valve 3.

Figure 16:
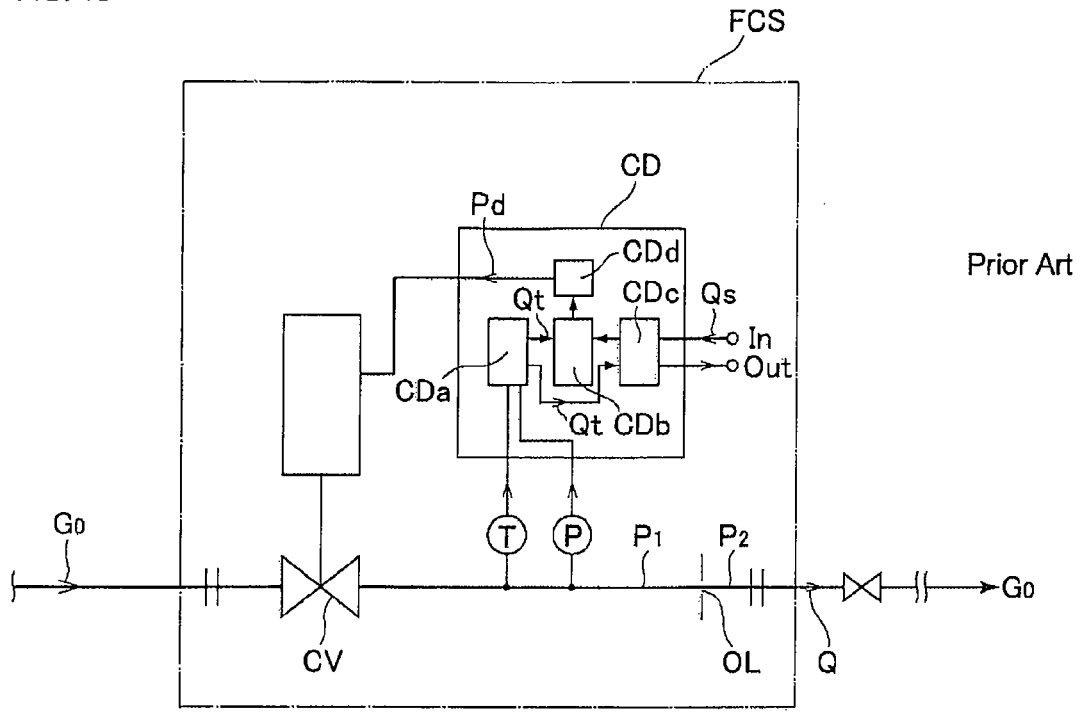
FIG. 16 is a configuration diagram of a pressure type flow control system using an orifice.
Figure 17:
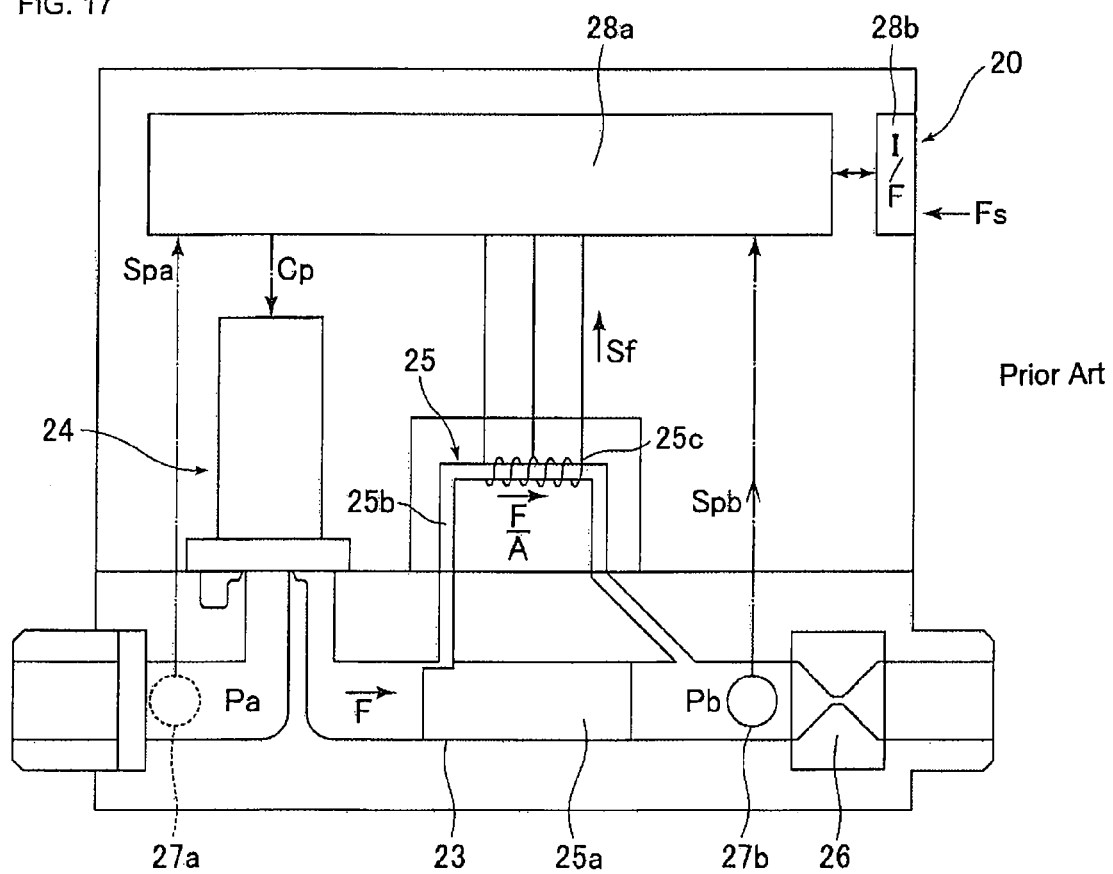
FIG. 17 is an explanatory diagram of a configuration of a mass flow control system according to a first embodiment disclosed by Japanese Patent No. 4137666.
Figure 18:
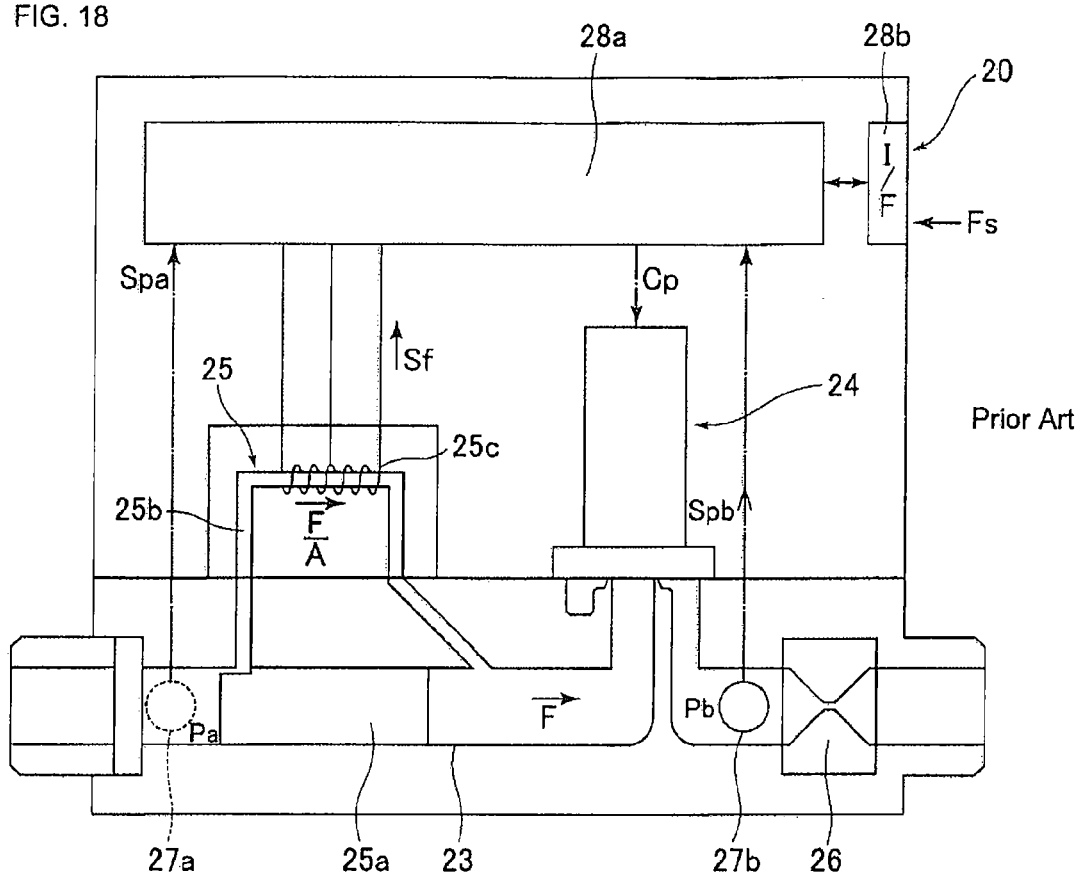
FIG. 18 is an explanatory diagram of a configuration of a mass flow control system according to a second embodiment disclosed by Japanese Patent No. 4137666.

Because the configurations of the pressure type flow control unit 1a and the flow rate arithmetic and control unit 7a thereof are substantially the same as those described in FIG. 16, detailed descriptions thereof are here omitted. Furthermore, as a matter of course, various types of ancillary mechanisms, such as the publicly-known zero-point adjustment mechanism and flow rate anomaly detection mechanism, and a gaseous species conversion mechanism (F. F. value conversion mechanism), are provided in the pressure type flow control unit 1a. Moreover, in FIG. 1, reference symbol 8 denotes an inlet side passage, reference symbol 9 denotes an outlet side passage, and reference symbol 10 denotes a fluid passage in the device main body.

The thermal type flow monitoring unit 1b composing the pressure type flow control system 1 with flow monitoring is composed of the thermal type flow sensor 2 and the flow sensor control unit 7b, and an input terminal $7b_1$ and an output terminal $7b_2$ are respectively provided for the flow sensor control unit 7b. Then, a setting signal within a flow rate range to be monitored is input from the input terminal $7b_1$, and a monitoring flow rate signal (i.e., a real flow rate signal) detected by the thermal type flow sensor 2 is output from the output terminal $7b_2$.

Furthermore, although not shown in FIG. 1, as a matter of course, input and output of the monitoring flow rate signal and a computed flow rate signal are appropriately carried out between the flow sensor control unit 7b and the pressure type flow rate arithmetic and control unit 7a, and a difference between them both, and a level of the difference, may be monitored. Alternatively, a warning may be issued in the case where the difference between both the monitoring flow rate signal and the computed flow rate signal exceeds a given value.

Figure 2:
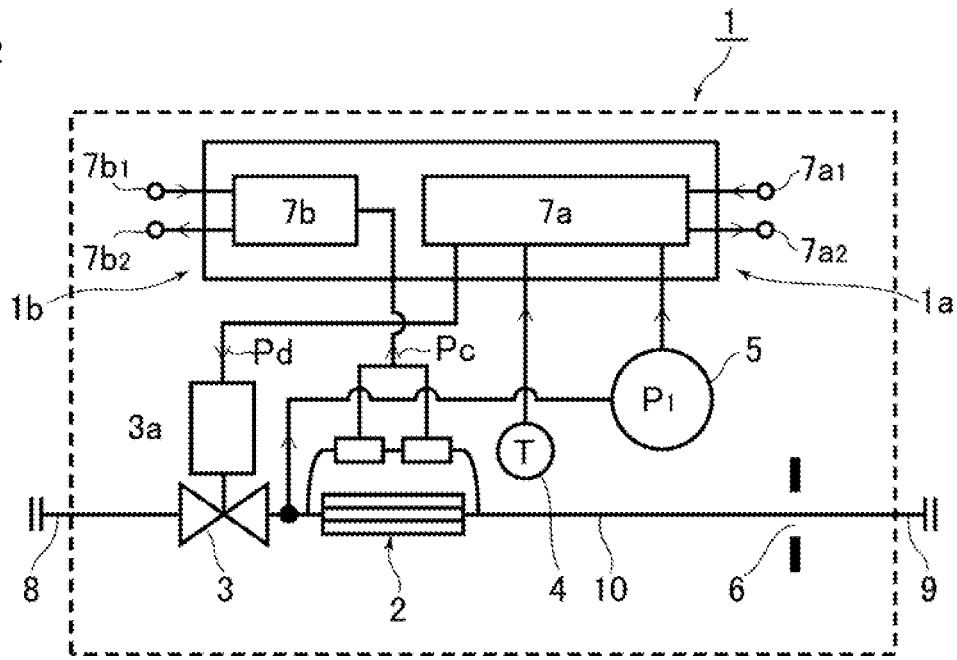
FIG. 2 is a schematic diagram of a configuration showing another example of a pressure type flow control system with flow monitoring, in accordance with another embodiment of the present invention.

FIG. 2 shows another example of the pressure type flow control system 1 with flow monitoring, which is configured to detect fluid pressure between the control valve 3 and the thermal type flow sensor 2 using the pressure sensor 5. In addition, other configurations and operations of the pressure type flow control system 1 with flow monitoring are completely the same as those in the case of the embodiment illustrated by FIG. 1.

Figure 3:
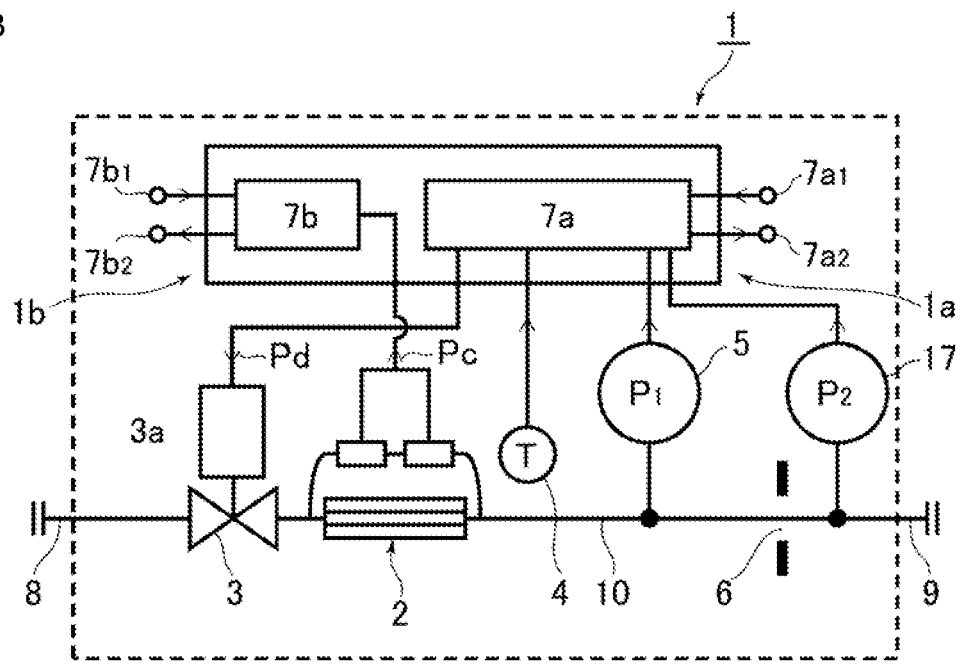
FIG. 3 is a schematic diagram of a configuration showing yet another example of the pressure type flow control system with flow monitoring.

FIG. 3 shows yet another example of the pressure type flow control system 1 with flow monitoring, in accordance with the present invention, in which a pressure sensor 17 is separately installed on the downstream side of the orifice 6. This embodiment makes it possible to monitor whether or not the fluid flowing through the orifice 6 is under the critical expansion conditions, to issue an alarm, or to perform flow control by use of differential pressure between the pressure sensor 5 and the pressure sensor 17.

Figure 4:
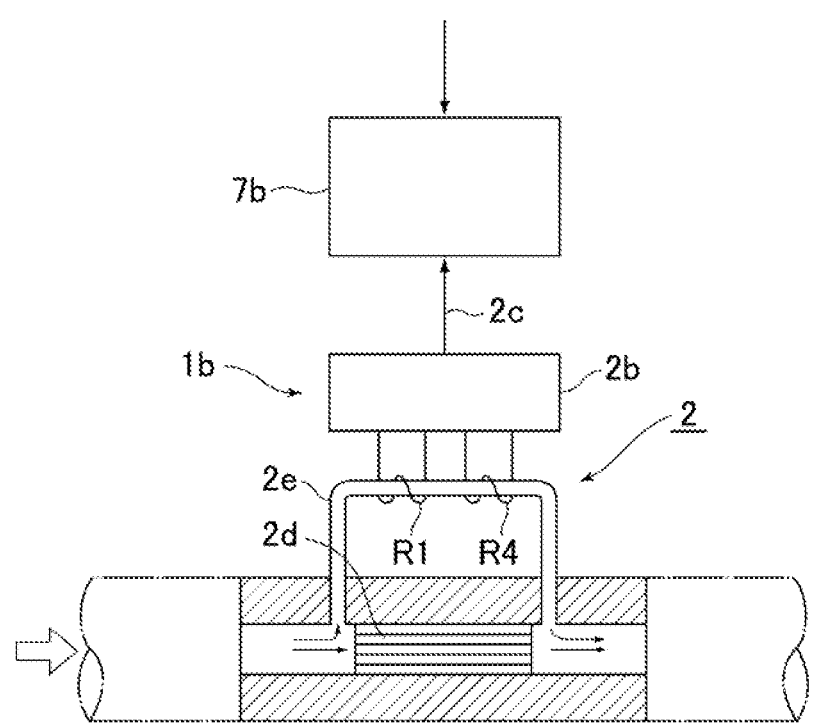
FIG. 4 is an explanatory diagram of a configuration of a thermal type flow sensor.
Figure 5:
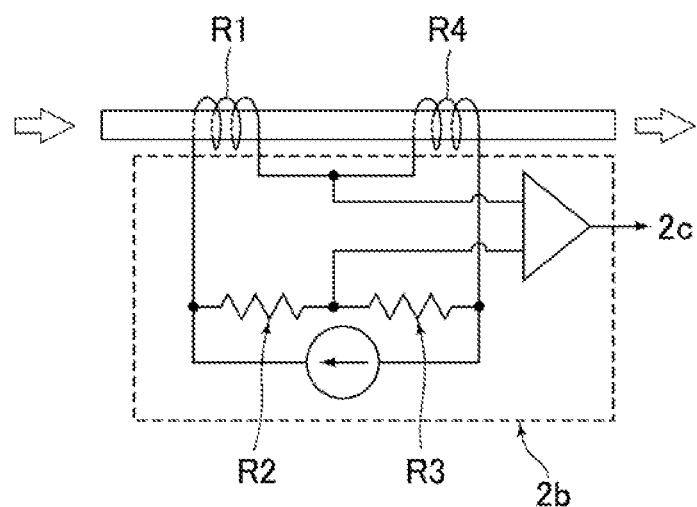
FIG. 5 is an explanatory diagram of the principle of operation of the thermal type flow sensor.

The thermal type flow monitoring unit 1b is composed of the thermal type flow sensor 2 and the flow sensor control unit 7b, and FIG. 4 and FIG. 5 show an outline of the configuration of the thermal type flow monitoring unit 1b. That is, as shown in FIG. 4, the thermal type flow sensor 2 has a bypass pipe group 2d (i.e., a laminar flow element) and a sensor pipe 2e which bypasses the bypass pipe group 2d. A gas fluid of a small quantity, compared to the bypass pipe group 2d, is made to flow through the sensor pipe 2e at a constant ratio. Furthermore, a pair of resistance wires R1 and R4 for control, which are series-connected, are rolled around the sensor pipe 2e to output a flow rate signal 2c indicating a mass flow rate value that is monitored by a sensor circuit 2b connected to the resistance wires R1 and R4.

The flow rate signal 2c is introduced into the flow sensor control unit 7b composed of, for example, a microcomputer or the like, to determine the real flow rate (i.e., the actual flow rate) of a currently flowing fluid on the basis of the flow rate signal 2c.

FIG. 5 illustrates a basic structure of the sensor circuit 2b of the thermal type flow sensor 2, and the series-connected circuits of two standard resistors R2 and R3 are connected in parallel to the series-connection of the resistance wires R1 and R4 described above, so as to form a bridge circuit. A constant current source is connected to this bridge circuit, and a connecting point between the resistance wires R1 and R4, and a connecting point between the standard resistors R2 and R3, are connected to the input side, to provide a differential circuit, which is configured to determine a potential difference between these two connecting points and to output this potential difference as the flow rate signal 2c.

In addition, because the thermal type flow sensor 2 and the flow sensor control unit 7b themselves are publicly known devices, detailed descriptions thereof are here omitted. Furthermore, in the present embodiment, a sensor mounted in the FCS-T1000 series manufactured by Fujikin Incorporated is used as the thermal type flow monitoring unit 1b.

Next, an embodiment of the invention, pertaining to a method for detecting an anomaly in a fluid supply system using the pressure type flow control system 1 with flow monitoring, will be described. Referring to FIG. 1, the pressure type flow control unit 1a of the pressure type flow control system with flow monitoring has a configuration substantially equivalent to a conventional pressure type flow control system FCS shown in FIG. 16, and a flow rate setting circuit (not shown) corresponding to a flow rate setting mechanism and a pressure indicating mechanism (not shown) corresponding to a pressure indicating mechanism, a flow rate output circuit (not shown) indicating a flow rate, and the like, are provided in the pressure type flow control unit 1a. Furthermore, a so-called flow rate self-diagnostic mechanism (not shown) is provided in the pressure type flow control unit 1a, which is, as will be described later, configured to compare initially set pressure drop characteristics and pressure drop characteristics at diagnosis, to judge or ascertain an abnormal state, and output its judgment or determination as a result.

Moreover, a mechanism of transmitting a signal of insufficient supply pressure is provided in the pressure type flow control unit 1a for the case where supply pressure from the gas supply source to the control valve 3 is insufficient. In this way, a signal is provided to indicate when it becomes not possible to supply a gas flow rate at the set flow rate, or when it becomes not possible to maintain the critical expansion conditions.

Figure 19:
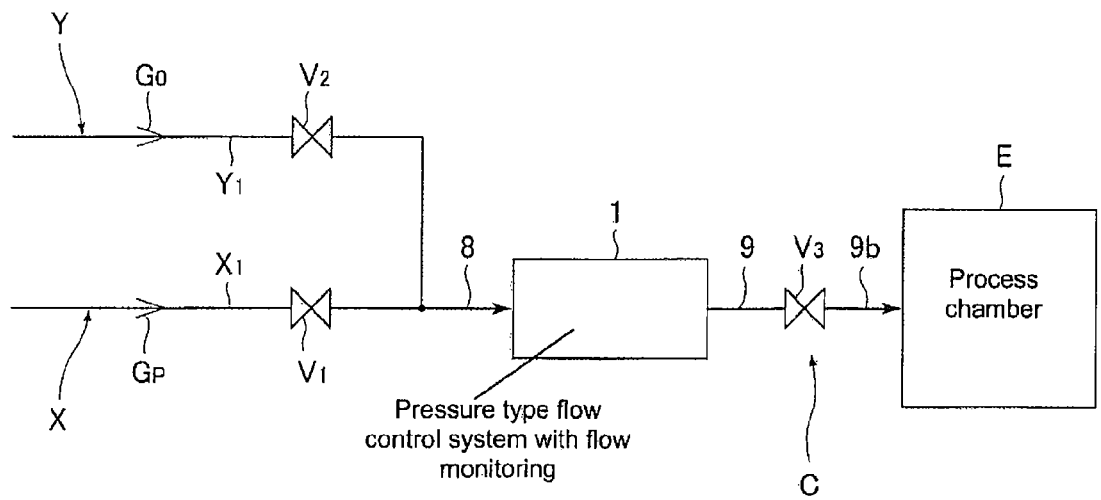
FIG. 19 is a block configuration diagram showing an example of a fluid supply system used for an embodiment of the present invention according to a method for detecting an anomaly.

FIG. 19 shows an example of a fluid supply system using the pressure type flow control system with flow monitoring, which is an objective to be implemented by the present invention. The fluid supply system is composed of a purge gas supply system Y, a process gas supply system X, the pressure type flow control system 1 with flow monitoring, a process gas using system C, and the like.

Furthermore, at the time of using the fluid supply system, usually, first, an inert gas such as $N_2$ or Ar is, as a purge gas Go, made to flow from the purge gas supply system Y to the pipe passage 8, to the pressure type flow control system 1 with flow monitoring, and to the pipe passage 9, and the like, to purge the inside of the fluid supply system. Thereafter, a process gas Gp is supplied in place of the purge gas Go, and the process gas Gp is supplied to the process gas using system C while regulating its flow rate to a desired flow rate in the pressure type flow control system 1 with flow monitoring. In addition, in FIG. 19, reference symbols $V_1$, $V_2$ and $V_3$ are valves, such as automatic opening/closing valves equipped with fluid pressure drive units and electromotive drive units.

The valves inspected by use of the present invention are the valves $V_1$, $V_2$ and $V_3$ in FIG. 19, and the like, and so-called seat leakages and operational anomalies in the valves $V_1$, $V_2$ and $V_3$ are inspected during preparation for starting to supply a process gas to a process chamber E or during preparation for stopping the supply of the process gas, or the like, by use of the pressure type flow control system with flow monitoring (hereinafter called the pressure type flow control unit 1a).

In more detail, the operational anomalies in the respective valves $V_1$, $V_2$ and $V_3$ are inspected in accordance with the following steps by use of the pressure type flow control unit 1a (i.e., the pressure type flow control system FCS).

A: Operational Anomaly in Valve $V_1$:
  a. A predetermined live gas (e.g., a process gas Gp) is made to circulate or flow, and the gas is made to circulate or flow at a predetermined set flow rate by the FCS. At this time, in the case where a flow rate indicated value and a pressure indicated value (in the pipe passage 8 and/or the pipe passage 9) of the FCS change to 0, then there is an anomaly (malfunction) in operation of the valve $V_1$.

b. A predetermined live gas (process gas Gp) is made to circulate or flow in the FCS, and in the case where an error signal of insufficient supply pressure is transmitted from the FCS during diagnosis (hereinafter called a "flow rate self-diagnosis for live gas") with respect to whether or not the live gas controlled flow rate of the FCS is a predetermined flow rate, then there is an anomaly (malfunction) in operation of the valve $V_1$.

B: Operational Anomaly in Valve $V_2$:

a. $N_2$ is made to circulate as a purge gasGo, and this purge gas is made to circulate or flow at a predetermined set flow rate by the FCS. At this time, in the case where a flow rate indicated value and a pressure indicated value of the FCS change to 0, then there is an anomaly (malfunction) in operation of the valve $V_2$.

b. A $N_2$ gas is made to circulate or flow in the FCS, and in the case where an error signal of insufficient supply pressure is transmitted from the FCS during diagnosis (hereinafter called at flow rate self-diagnosis for $N_2$) with respect to whether or not the $N_2$ controlled flow rate of the FCS is a predetermined flow rate, then there is an anomaly (malfunction) in operation of the valve $V_3$.

C: Operational Anomaly in Valve $V_3$:

a. In the case where an error signal of flow rate self-diagnosis is transmitted from the FCS, a flow rate self-diagnosis for $N_2$ or at flow rate self-diagnosis for live gas under the condition that $N_2$, or the live gas, is made to flow, then there is an anomaly (malfunction of the valve $V_2$)

b. In the case where the pressure output indication of the FCS does not drop to zero at the time of vacuuming a pipe passage 9b, and the like, then there is an anomaly (malfunction) in operation of the valve $V_3$.

c. In the case where there is no change in the pressure indicated value of the FCS even when the flow rate set value is appropriately changed at the time of setting the flow rate of the FCS, then there is an operational anomaly (malfunction) in the valve $V_3$.

Furthermore, the seat leakages in the respective valves $V_1$, $V_2$ and $V_3$ are inspected in accordance with the following steps by use of the FCS.

A: Seat leakage in valve $V_1$:

a. When there is a seat leakage in the valve $V_1$ at flow rate self-diagnosis of the FCS with $N_2$, the $N_2$ flows back toward the live gas Gp side, and the live gas Gp on the upstream side of the valve $V_1$ becomes a mixed gas of the $N_2$ and the live gas Gp.

Thereafter, when the flow rate self-diagnosis for live gas of the FCS is executed, the flow rate self-diagnosis for live gas is performed with the mixed gas, and the diagnosed value becomes an abnormal value. Due to this diagnosed value becoming an abnormal value, it becomes apparent that there is a seat leakage in the valve $V_1$.

More specifically, in the case of a flow factor F. F. of the live gas (process gas Gp)>1, the diagnostic result is deviated to the "−" side (minus side), and in the case of a flow factor F. F. of the live gas (process gas Gp)<1, the diagnostic result is deviated to the "+" side (plus side).

In addition, the flow factor F. F. is a value indicating how many times by the standard gas ($N_2$) that the live gas flow rate is multiplied in the case where the orifice of the FCS, and the pressure $P_1$ on the upstream side of the orifice, are the same. Thus, the value defined by F. F.=live gas flow rate/$N_2$ flow rate (e.g., refer to Japanese Published Unexamined Patent Application No. 2000-66732, and the like, such as equivalent U.S. Pat. No. 6,314,992 B1 that is incorporated herein by reference).

B. Seat leakage in valve $V_2$. In the case where the diagnosed value of the flow rate self-diagnosis for live gas is an abnormal value, then a seat leakage is detected in the valve $V_2$. Because the $N_2$ gas is mixed into the live gas Gp of the pipe passage 8 on the upstream side of the FCS, and the flow rate self-diagnosis for live gas is performed with the mixed gas in the FCS, the diagnosed value becomes an abnormal value.

C. Seat leakage in valve $V_3$. After the completion of flow control by the FCS, the valve $V_3$ is maintained in a closed state, and the flow rate setting of the FCS is set to 0 (i.e., the flow rate is set to zero). Thereafter, when the pressure indicated value of the FCS drops, a seat leakage is detected in the valve $V_3$.

By carrying out the respective operations by use of the FCS as described above, it is possible to detect operational anomalies and seat leakages in the valves $V_1$, $V_2$ and $V_3$ by use of the FCS in the fluid supply system having the configuration of FIG. 19.

In addition, in the embodiment of FIG. 19, the fluid supply system equipped with three valves is an object to which the present invention is applied. Meanwhile, as a matter of course, the present invention is applicable even when the number of the process gas supply systems Y is more than one, or even when the number of the process gas using systems C is more than one.

Figure 20:
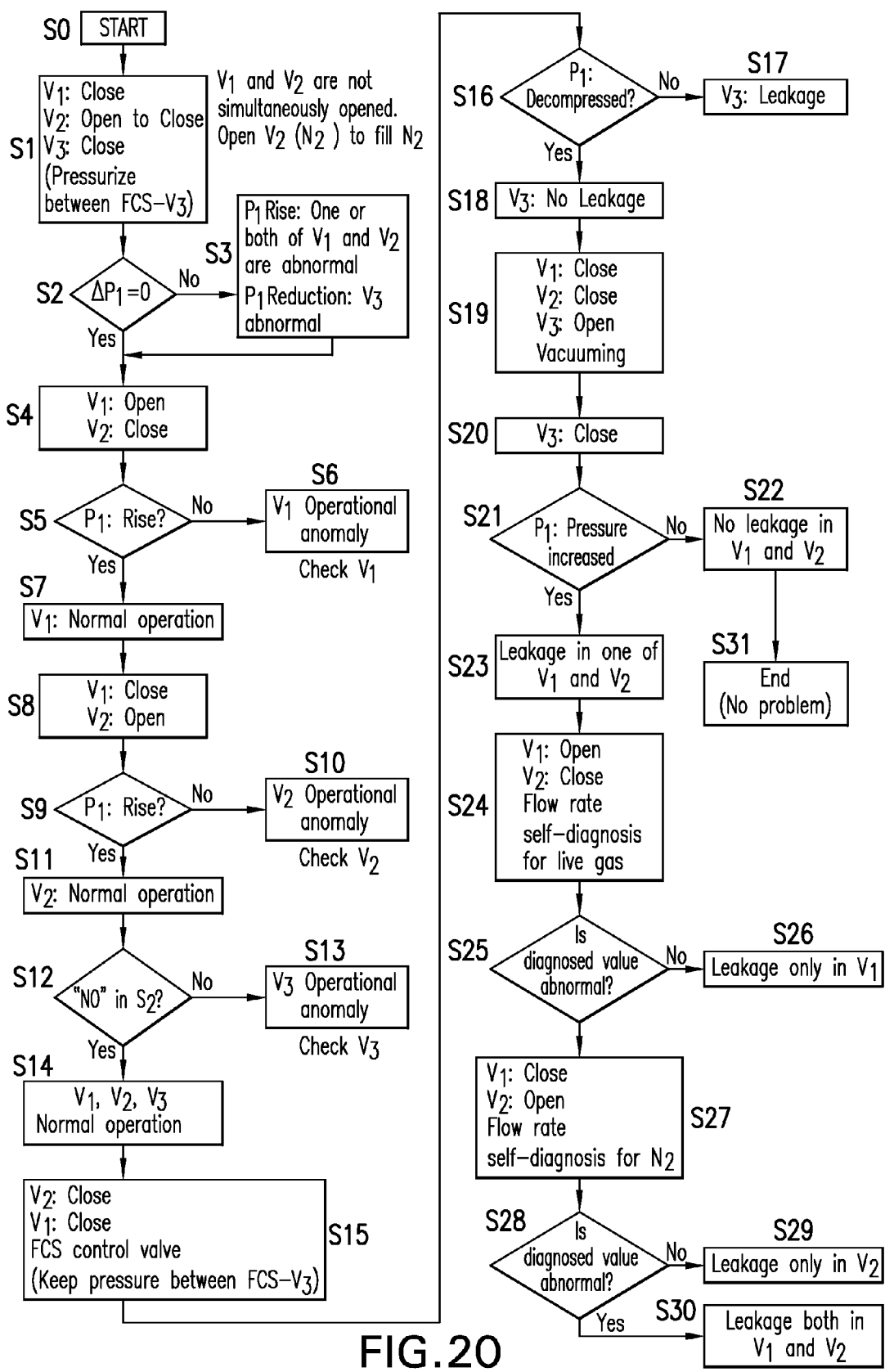
FIG. 20 is a flow diagram showing an example of a method for detecting anomalies in valves of the fluid supply system according to the present invention.

FIG. 20 illustrates a flow diagram in the case where anomalies in the respective valves $V_1$, $V_2$ and $V_3$ of the fluid supply system shown in FIG. 19 are checked. In addition, this flow diagram is premised on the presumption that there are no external leakages (for example, leakages from joints, hoods, and the like) other than seat leakages in valve $V_1$ when determining whether there is a seat leakage in valve $V_1$. It is also presumed that the respective valves $V_1$, $V_2$ and $V_3$, the FCS, and the pipe passages 8, 9, 9b, and the like, have no external leakages other than seat leakages in valve $V_2$, and the drive units of the respective valves function normally function when determining whether there is a seat leakage in valve $V_2$. It is further presumed that the FCS functions normally, and that the $V_1$ and $V_2$ valves are not simultaneously opened in any case, and the like, in FIG. 19.

First, according to the flow diagram of FIG. 20, an anomaly check is started in Step $S_0$. Next, in Step $S_1$, operations of closing the valve $V_1$, opening to closing (switching) the valve $V_2$, closing the valve $V_3$, and opening the FCS control valve are carried out, and the pipe passage 9 on the downstream side of the FCS is filled with $N_2$.

In Step $S_2$, the pressure indication $P_1$ of the FCS, i.e., the pressure indication $P_1$ of the pressure sensor 1a in FIG. 1 is checked, to judge or ascertain whether or not an increase and decrease $\Delta P_1$ of $P_1$ is 0.

In the case where the $\Delta P_1$ is not 0, and the $P_1$ rises, it is judged or determined that one or both of the valves $V_1$ and $V_2$ are abnormal (e.g., have seat leakages or operational defects). Furthermore, in the case where the $\Delta P_1$ is not 0 and the $P_1$ is decreased, it is judged or determined that the valve $V_3$ is abnormal (i.e., valve $V_3$ has a seat leakage or an operational defect) (Step $S_3$).

Next, in Step $S_4$, after vacuuming the insides of the pipe passages by closing the valve $V_1$, closing the valve $V_2$, opening the valve $V_3$, and opening the FCS control valve, the process gas (live gas) Gp is made to flow in the FCS by opening the valve $V_1$ and closing the valve $V_2$, and the pressure indication $P_1$ of the FCS is checked in Step $S_5$. It is judged or determined that the operation of valve $V_1$ is normal when the $P_1$ rises (Step $S_7$), and it is judged or determined that the valve $V_1$ is abnormal in operation when the $P_1$ does not rise (Step $S_6$), in order to check the operating status of the valve $V_1$.

Thereafter, in Step $S_8$, after vacuuming the insides of the pipe passages by closing the valve $V_1$, closing the valve $V_2$, opening the valve $V_3$, and opening the FCS control valve, wherein the pressure indication $P_1$ of the FCS is checked by closing the valve $V_1$ and opening the valve $V_2$ (Step $S_9$). It is judged or ascertained that valve $V_2$ is abnormal in operation when the $P_1$ does not rise (Step $S_{10}$), in order to check the operating status of the valve $V_2$. Further, it is judged or ascertained that the operation of the valve $V_2$ is normal when the $P_1$ rises (Step $S_{11}$).

Next, in Step $S_{12}$, it is judged or determined whether or not the anomalies in the valves in the Step $S_2$ correspond to an anomaly in operation of the valve $V_3$. That is, it is judged or determined that valve $V_3$ is abnormal in operation when the judgment or determination in Step $S_2$ is "No" (i.e., any one of the valves $V_1$, $V_2$ and $V_3$ is abnormal in operation) and the operations of the valves $V_1$ and $V_2$ are normal (Step $S_{13}$). Furthermore, it is judged or determined that the operations of the respective valves $V_1$, $V_2$ and $V_3$ are normal when the judgment or determination in Step $S_2$ is "Yes" (Step $S_{14}$).

Next, the check for seat leakages in the respective valves $V_1$, $V_2$ and $V_3$ is carried out. That is, in Step $S_{15}$, after vacuuming the insides of the pipe passages by closing the valve $V_1$, closing the valve $V_2$, opening the valve $V_3$, and opening the control valve 3 of the FCS, by closing the valve $V_1$, opening to closing (switching) the valve $V_2$, and closing the valve $V_3$ in the same way as in Step $S_1$, the pipe passage 9b between the FCS and the valve $V_3$ is pressurized so as to keep the pressure indication $P_1$ of the FCS (that is, keep the pressure between the control valve 3 and the valve $V_3$).

In Step $S_{16}$, decompression of the $P_1$ is checked, and when there is decompression, it is judged or ascertained that there is a seat leakage in the valve $V_3$ (Step $S_{17}$). Furthermore, when there is no decompression, it is judged or determined that there is no seat leakage in the valve $V_3$ (Step $S_{18}$).

Next, in Step $S_{19}$, after vacuuming the insides of the pipe passages by closing the valve $V_1$, closing the valve $V_2$, opening the valve $V_3$, and opening the control valve 3 of the FCS, the pipe passages 8, 9 and 9b are decompressed (vacuumed) by closing the valve $V_1$, closing the valve $V_2$, and opening the valve $V_3$, and thereafter the valve $V_3$ is closed (Step $S_{20}$). Thereafter, the pressure indication $P_1$ of the FCS is checked in Step $S_{21}$, and when the pressure indication $P_1$ is not increased in pressure, it is judged or determined that there is no seat leakage in the valves $V_1$ and $V_2$ in Step $S_{22}$, and the anomaly check is completed (Step $S_{31}$).

Furthermore, when the pressure indication $P_1$ is increased in pressure in Step $S_{21}$, it is judged that there is a seat leakage in one of the valves $V_1$ and $V_2$ (Step $S_{23}$), and the algorithm or flow diagram proceeds to the process of judging or determining in which valve there is a seat leakage.

In Step $S_{24}$, after vacuuming the insides of the pipe passages by closing the valve $V_1$, closing the valve $V_2$, opening the valve $V_3$, and opening the control valve 3 of the FCS, by opening the valve $V_1$ and closing the valve $V_2$, a flow rate self-diagnosis for live gas of the pressure type flow control system 1 with flow monitoring is carried out. That is, the pressure drop characteristics when the live gas (process gas Gp) is made to flow and the initial set pressure drop characteristics are compared, and when a difference between the pressure drop characteristics and the initial set pressure drop characteristics is an allowable value or lower, it is judged or ascertained that there is no anomaly in the diagnosed value. Furthermore, in contrast, in the case where the difference between the pressure drop characteristics and the initial set pressure drop characteristics is higher than the allowable value, it is judged or ascertained that there is an anomaly in the diagnosed value.

In Step $S_{24}$, when there is no anomaly in the diagnosed value, it is judged or ascertained that there is a seat leakage only in the valve $V_1$ (Step $S_{26}$). This is because, even when there is a seat leakage in the valve $V_1$, when there is no seat leakage in the valve $V_2$, a fluid flowing into the pressure type flow control system 1 with flow monitoring (FCS) is only the process gas Gp. Accordingly, no anomaly is caused in the diagnosed value of the flow rate self-diagnosis for live gas.

On the other hand, in the case where there is an anomaly in the diagnosed value in Step $S_{24}$, the valve $V_1$ is closed and the valve $V_2$ is opened, to carry out a flow rate self-diagnosis for $N_2$ of the pressure type flow control system 1 with flow monitoring in Step $S_{27}$. That is, the pressure drop characteristics when the $N_2$ gas is made to flow and the initial pressure drop characteristics are compared, and when a difference between both the pressure drop characteristics when the $N_2$ gas is made to flow and the initial pressure drop characteristics is an allowable value or lower, it is diagnosed that there is no anomaly in the diagnosed value. Furthermore, in the case where the difference between both the pressure drop characteristics when the $N_2$ gas is made to flow and the initial pressure drop characteristics is higher than the allowable value, it is diagnosed that the diagnosed value is abnormal.

In Step $S_{28}$, when there is no anomaly in the diagnosed value of the flow rate self-diagnosis for $N_2$, it is judged or ascertained that there is a seat leakage only in the valve $V_2$ in Step $S_{29}$. This is because, when there is a seat leakage in the valve $V_1$, the live gas is mixed into the $N_2$, so as to cause an anomaly in the diagnosed value of the flow rate self-diagnosis for the FCS.

In contrast, in Step $S_{28}$, in the case where there is an anomaly in the diagnosed value of the flow rate self-diagnosis for $N_2$, a seat leakage is present in the valve $V_1$, and a mixed gas of the $N_2$ and the live gas flows into the FCS, so as to cause an anomaly in the diagnosed value. Consequently, in Step $S_{303}$ it is judged or determined that seat leakages are caused in both of the valves $V_1$ and $V_2$.

In addition, in the anomaly check flow diagram of FIG. 20, there is a flow of the algorithm in that, after detecting anomalies in the valves $V_1$, $V_2$ and $V_3$ in Step $S_3$, operational anomalies and seat leakage anomalies in the respective valves $V_1$, $V_2$ and $V_3$ are sequentially checked. However, when an anomaly is detected in Step $S_3$, it may be first determined whether the type of the anomaly is an operational anomaly or a seat leakage in a valve from a fluctuation level of the anomaly, and when the type of the anomaly is an operational anomaly, Step $S_4$ to Step $S_{13}$ may be executed. And, when the type of the anomaly is a seat leakage anomaly, Step $S_{15}$ to Step $S_{30}$ may be executed, respectively.

Furthermore, with respect to the determination of the operational anomaly, it is possible to judge or ascertain from the pace of increase in the pressure indication $P_1$ or the pace of decrease in the pressure indication $P_1$ in Step $S_3$. When the pace of increase in the pressure indication $P_1$ is high, it is possible to judge or ascertain an anomaly in opening/closing of the valve, and when the pace of increase in the pressure indication $P_1$ is low, it is possible to judge or ascertain a seat leakage anomaly in the valve.

Next, the relationship between the pressure drop characteristics at flow rate self-diagnosis and a cause of anomaly, and the like, in the case where a result of the flow rate self-diagnosis is judged or ascertained as abnormal has been verified. In addition, the flow rate self-diagnosis is, as described above, used to compare the initial set pressure drop characteristics and the pressure drop characteristics at diagnosis, and to judge or determine as abnormal in the case where a difference between the initial set pressure drop characteristics and the pressure drop characteristics at diagnosis is out of a range determined in advance.

First, the inventors configured a basic fluid supply system as shown in FIG. 19, and caused a fault (i.e., an anomaly) in a simulating manner, and then surveyed the pressure drop characteristics associated with the respective anomalies. Furthermore, the inventors analyzed the relationship between the obtained pressure drop characteristics and its occurrence factors in order to find the existence of a close constant relationship between the pattern of pressure drop characteristics and the corresponding cause of the anomaly occurrence. In other words, the inventors found, via simulations, that it is possible to know the cause of an anomaly occurrence if a pattern of pressure drop characteristics at the time of the anomaly occurrence becomes apparent.

Figure 21B:
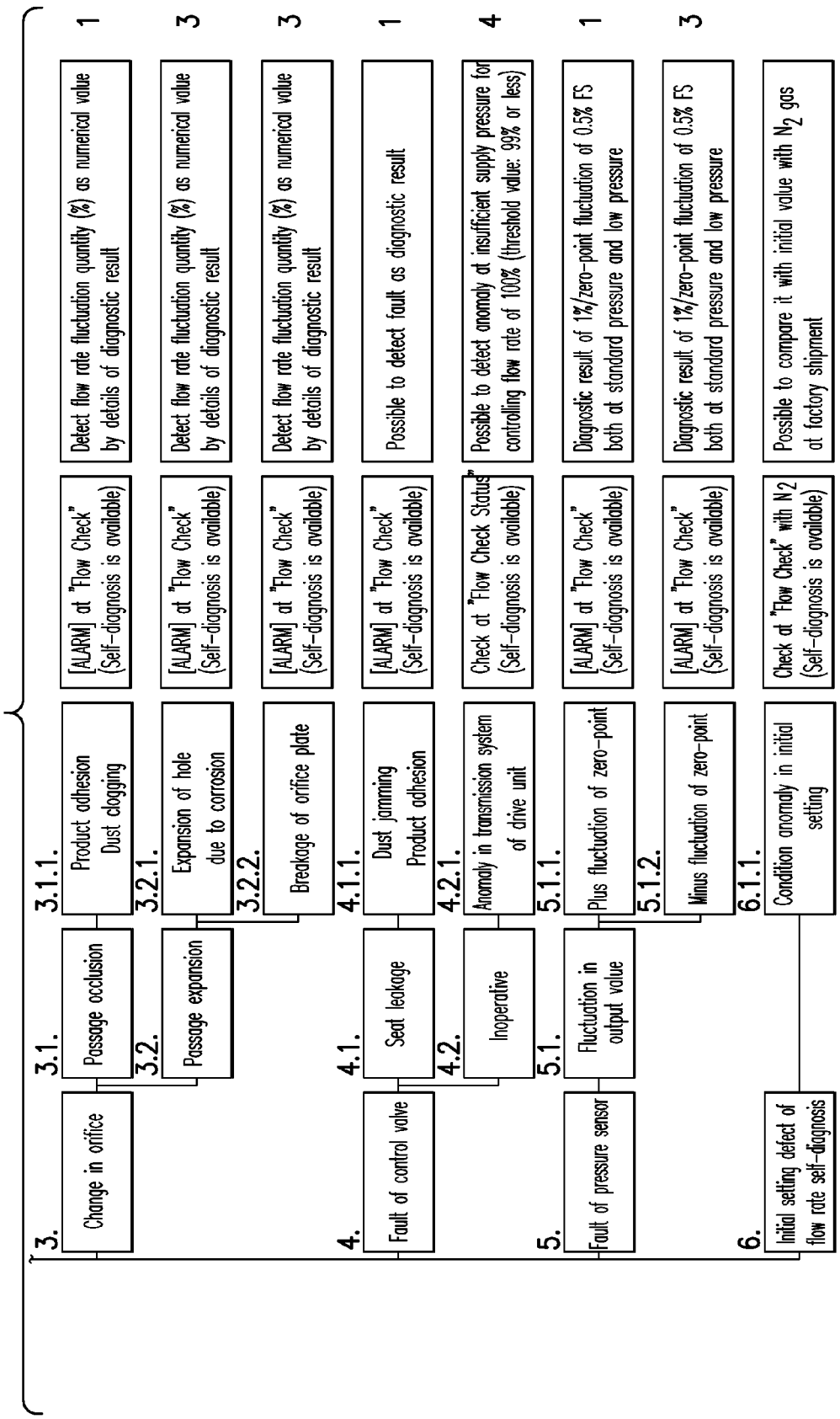
FIG. 21, comprised of FIG. 21A and FIG. 21B in an exploded view over two pages to allow for legibility, shows the relationship between types of faults, genesis phenomena, and causes of occurrence at flow rate self-diagnosis.
Figure 22:
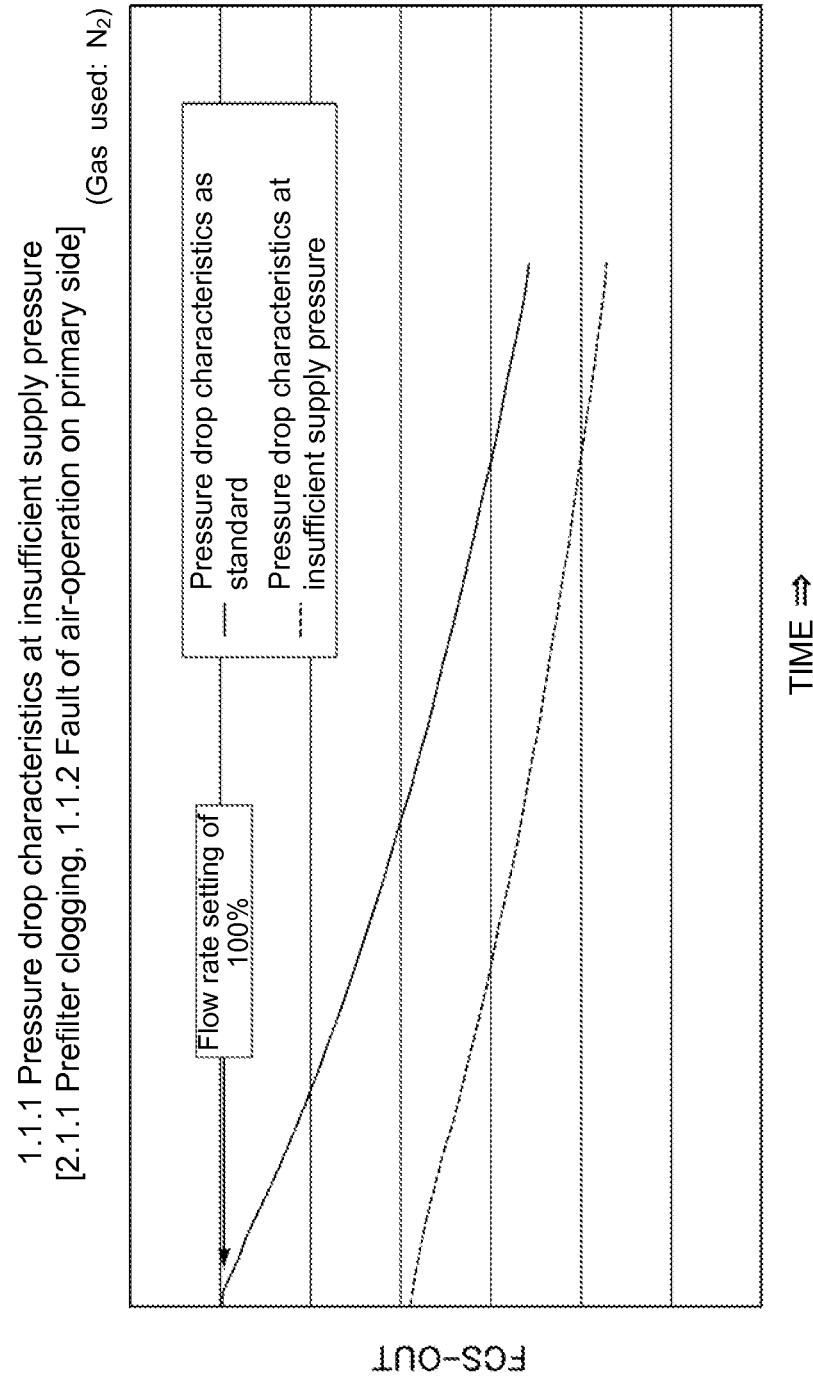
FIG. 22 shows a representative example of pressure drop characteristics as graphed in the case of insufficient supply pressure at flow rate self-diagnosis of the pressure type flow control system with flow monitoring.

FIG. 21, comprised of FIG. 21A and FIG. 21B in an exploded view over two pages to allow for legibility, shows that the relationships between various specific types of faults A (identification of faults), which are caused in a simulated manner at flow rate self-diagnosis, and phenomena B that are caused by the faults A, and general factors C pertaining to the faults that directly lead to the genesis of phenomena B, may be surveyed. FIG. 21 constitutes a compilation of these relationships as a chart. Furthermore, the numerical values 1 to 4 in the fields regarding the patterns of pressure drop characteristics indicate the types of the patterns of the pressure drop characteristics that are respectively caused with respect to the specific types of faults A, as will be described later.

FIG. 22 to FIG. 28 show the pressure drop characteristics at flow rate self-diagnosis corresponding to cases where the respective specific faults shown in FIG. 21 are caused and, respectively, the horizontal axis shows the time, and the vertical axis shows the detection pressures of the pressure type flow control unit 1*a*, i.e., the FCS. That is, in FIG. 22, the control pressure is insufficient at the time of maintaining a flow rate of 100%, due to insufficient supply pressure from the gas supply source side, and the pattern of pressure drop characteristics becomes a pattern of the type 4, which will be described later.

In FIG. 23(*a*), the pressure on the secondary side of the orifice rises because of a fault pertaining to air operation of the air operated valve $V_3$ on the secondary side (i.e., the output side of the FCS). As a result, a pressure drop delays in the process of diagnosis (and becomes a pattern of Type 2). Furthermore, in FIG. 23(*b*), the pressure on the secondary side of the orifice rises because a leaked gas flows into the secondary side from the outside on the secondary side of the orifice. Thus, the pattern of the pressure drop characteristics becomes the pattern of Type 2, which is the same pattern as that in the case of FIG. 23(*a*).

In FIG. 24(*a*), because gas at a high flow factor (F. F.) flows into the primary side of the pressure type control unit 1*a*, i.e., the FCS, it becomes easy to increasingly outgas from a throttle mechanism (orifice), as a result, a pressure drop in the pressure drop characteristics accelerates (thereby exhibiting a pattern of Type 3). In contrast, in FIG. 24(*b*), because gas at a low flow factor (F. F.) flows into the primary side of the FCS, it becomes difficult to outgas from the throttle mechanism (orifice), and a pressure drop in the pressure drop characteristics delays (thereby exhibiting the pattern of Type 1). In addition, the throttle mechanism is explained with the orifice in the following description.

In FIG. 25(*a*), because the orifice is clogged, it becomes difficult to outgas from the orifice, and a pressure drop in the pressure drop characteristics delays (thereby exhibiting the pattern of Type 1). In contrast, in FIG. 25(*b*), because the orifice is expanded in diameter (e.g., such as may occur due to flow erosion of the opening of the orifice due to the flow of gas through the orifice), it becomes easy to outgas from the orifice, and a pressure drop accelerates (thereby exhibiting the pattern of Type 3).

Figure 26:
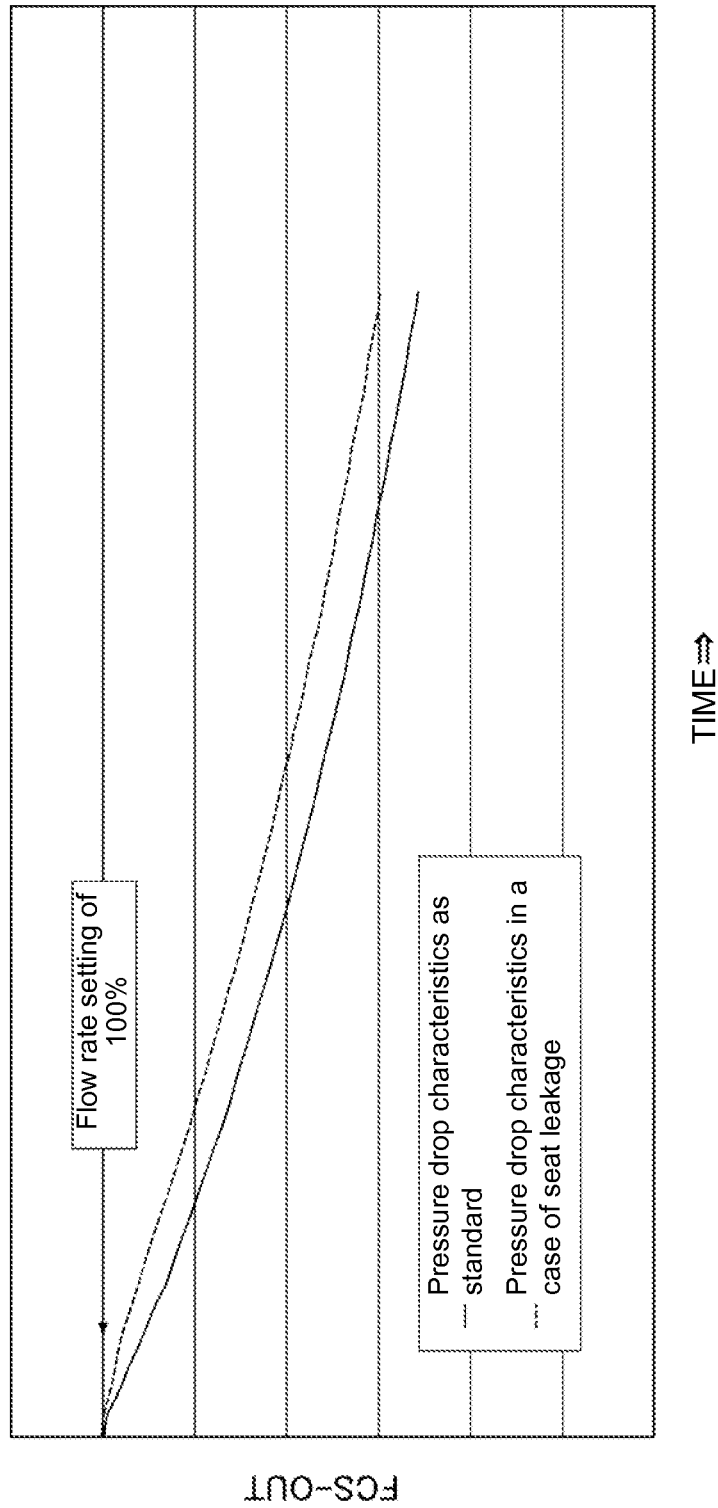
FIG. 26 shows a representative example of pressure drop characteristics as graphed in the case where there is a seat leakage in a control valve of the pressure type flow control system with flow monitoring.

In FIG. 26, because a seat leakage is caused in the control valve 3, gas flows from the control valve 3 during a flow rate self-diagnosis, and the pressure drop in the pressure drop characteristics delays (thereby exhibiting the pattern of Type 1).

Figure 27:
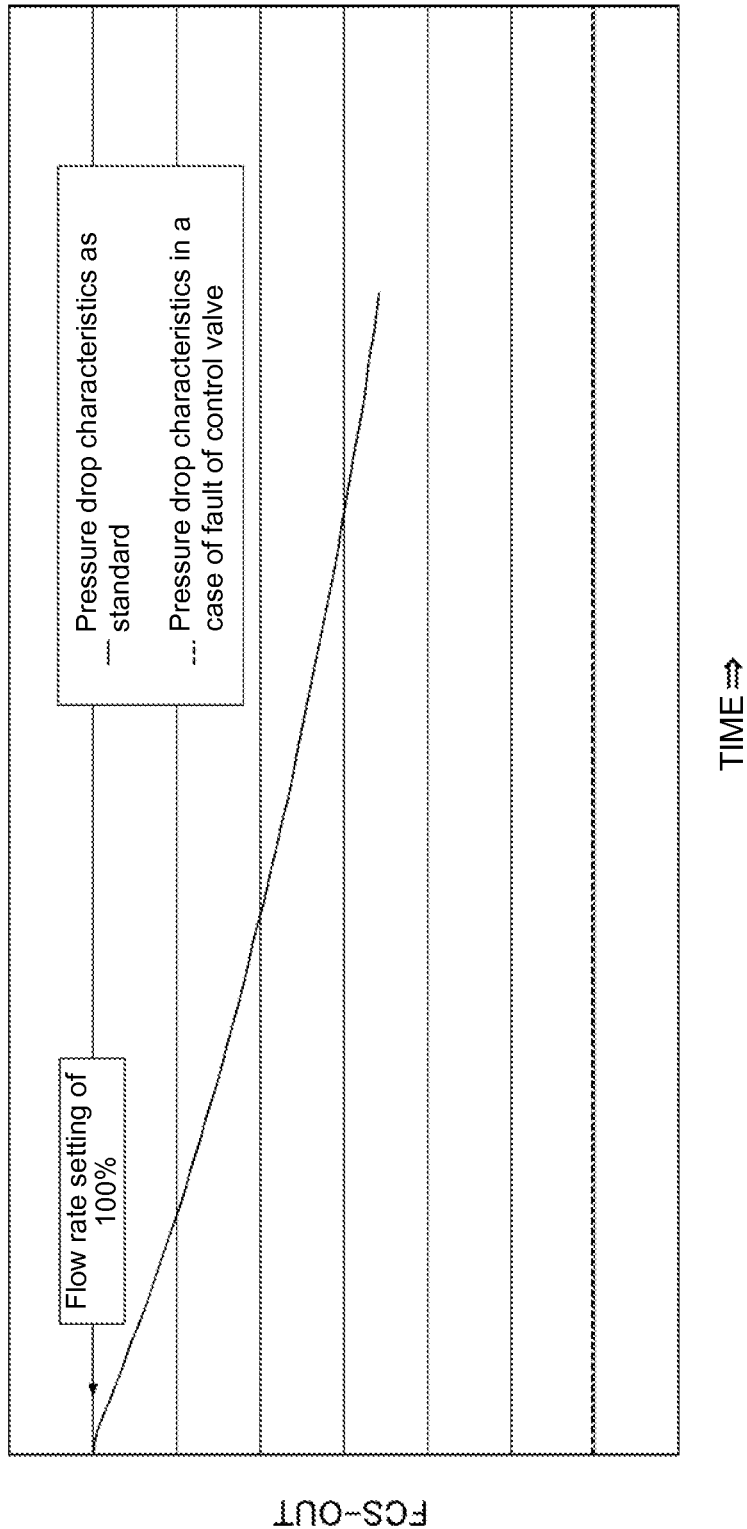
FIG. 27 shows a representative example of pressure drop characteristics, as graphed, in the case where there is a fault of a drive unit of the control valve of the pressure type flow control system with flow monitoring.

In FIG. 27, because there is an anomaly in a transmission system of the drive unit of the control valve 3, the control valve does not open smoothly. Consequently, a seat leakage occurs. As a result, supply of gas is not carried out and the gas does not flow, therefore, the pressure drop characteristics are not changed (thus, the pattern of Type 4 is exhibited).

Figure 28:
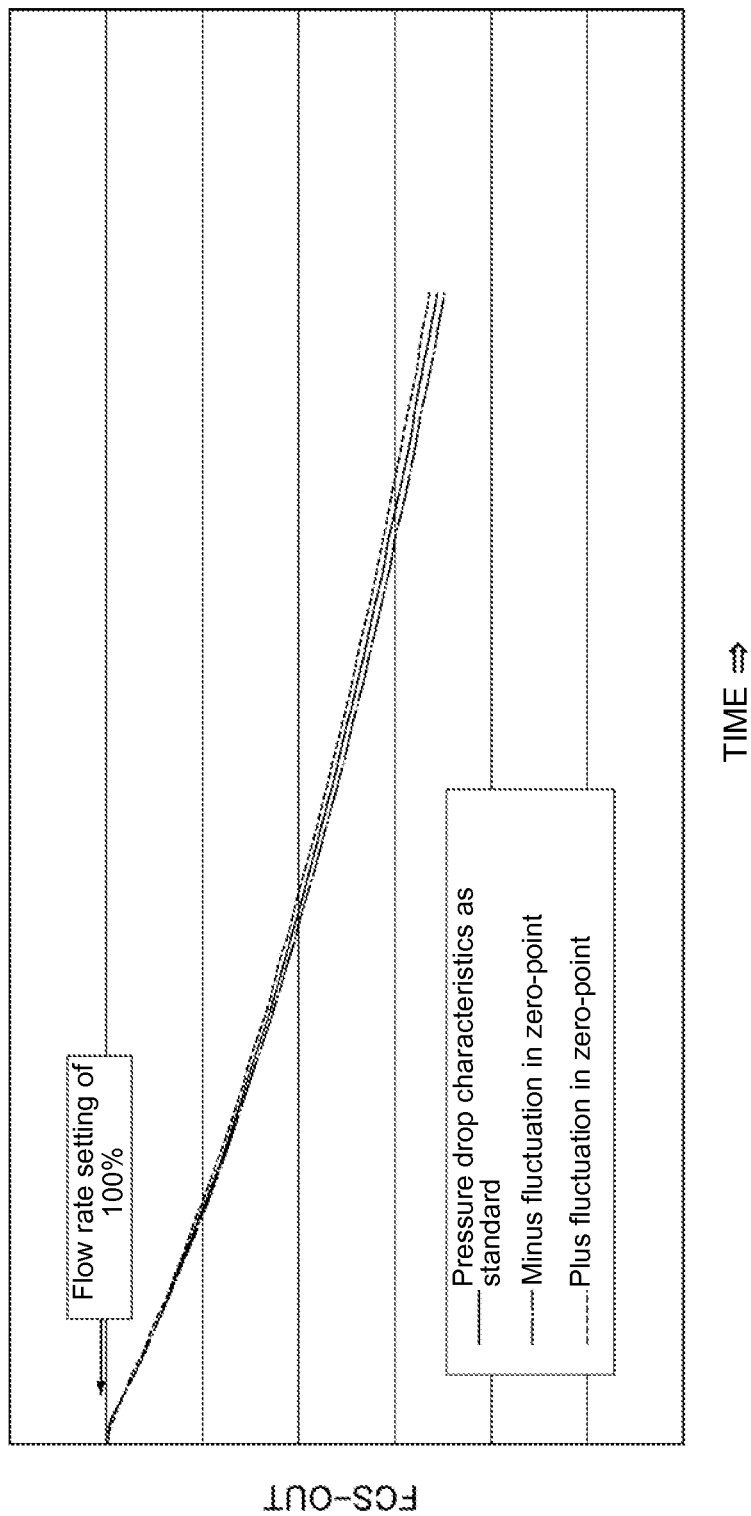
FIG. 28 shows a representative example of pressure drop characteristics as graphed at the time of zero-point fluctuation of the pressure type flow control system with flow monitoring.

FIG. 28 shows the case where the zero-point adjustment of the pressure type flow control unit 1*a* goes out of order. When the zero-point is fluctuated on the plus side, the pressure drop delays so the pattern of Type 1 is exhibited. Furthermore, when the zero-point is fluctuated on the minus side, the pressure drop accelerates, and the pressure drop characteristics thereof become those of the pattern of Type 3. Thus, in accordance with this disclosure, a zero-point fluctuation on the side of "plus" corresponds to pressure drop delays, and a zero-point fluctuation of the side of "minus" corresponds to pressure drop acceleration. Moreover, a minus fluctuation of the zero-point and a plus fluctuation of the zero-point are phenomena that can cause problems in any device such as a pressure sensor, a control unit 1*a*, and a monitoring unit 1*b*.

Figure 29:
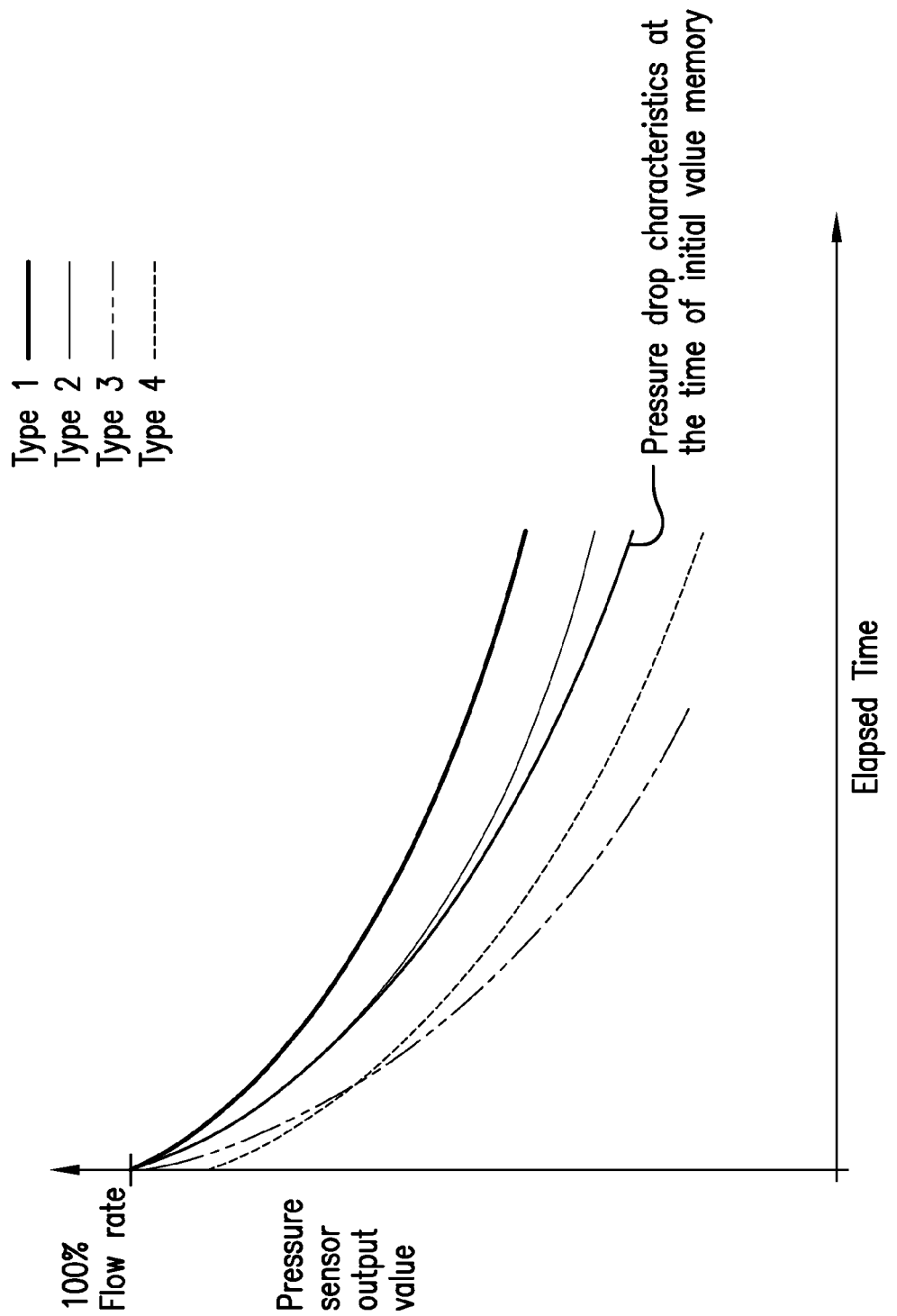
FIG. 29 shows the four types of pressure drop characteristics, which are derived from the patterns of the respective pressure drop characteristics of FIG. 21 to FIG. 26.

FIG. 29 collectively shows the various patterns of the different types of the pressure drop characteristics exhibited at the flow rate self-diagnosis as shown in FIG. 22 to FIG. 28.

Thus, in accordance with the present disclosure, the pressure drop characteristics are roughly classified into patterns of four types, which are summarized below according to the following Types 1 to 4.

Pressure drop characteristics of Type 1 (Pressure drop delays immediately after diagnosis): This pattern is caused in the case of a fault, such as interfusion of gas at a low flow factor, product adhesion/dust clogging of the orifice, dust jamming in the control valve, product adhesion (seat leakage), or a plus fluctuation of the zero-point.

Pressure drop characteristics of Type 2 (Pressure drop delays in the process of diagnosis): This pattern is caused in the case of a fault of the air-operated mechanism of the valve on the secondary side, or due to a fault of a leakage from the outside to the secondary side, or the like.

Pressure drop characteristics of Type 3 (Pressure drop accelerates immediately after diagnosis): This pattern is caused in the case of a fault, such as interfusion of gas at a high flow factor, inappropriate input of zero-point, clogging of the hole (orifice) due to corrosion, breakage of an orifice plate, or a minus fluctuation of the zero-point.

Pressure drop characteristics of Type 4 (The flow rate does not reach 100% at initial diagnosis): This pattern is caused in the case of insufficient supply pressure, a fault of the air-operated mechanism on the primary side, dust clogging (of a prefilter), an anomaly in the transmission system of the drive unit of the control valve (i.e., a fault of the control valve), or the like.

As is clear from the descriptions of FIG. 21 and FIG. 22 to FIG. 29, in accordance with the present invention, by reviewing which one of the Types 1 to 4 a pattern of pressure drop characteristics occurring at a flow rate self-diagnosis corresponds to, it is possible to easily determine the cause of the fault and its place of occurrence, which makes it possible to efficiently and swiftly repair (or inspect) the gas supply system.

Next, when a seat leakage, or the like, is caused in a valve of the fluid supply system, or some fault is caused in the pressure type flow control system 1 itself, provided with flow monitoring 1, it becomes apparent that there is an anomaly in a monitoring flow rate occurring at the flow rate self-diagnosis. Thus, it is determined, in accordance with the present invention, whether the anomaly in the monitoring flow rate is caused by an anomaly in the fluid supply system, or by an anomaly in the pressure type flow control system 1 itself. When a fault, or the like, in the pressure type flow control system 1 is the cause of the anomaly in the monitoring flow rate, it is necessary to swiftly replace the pressure type flow control system 1.

Figure 30:
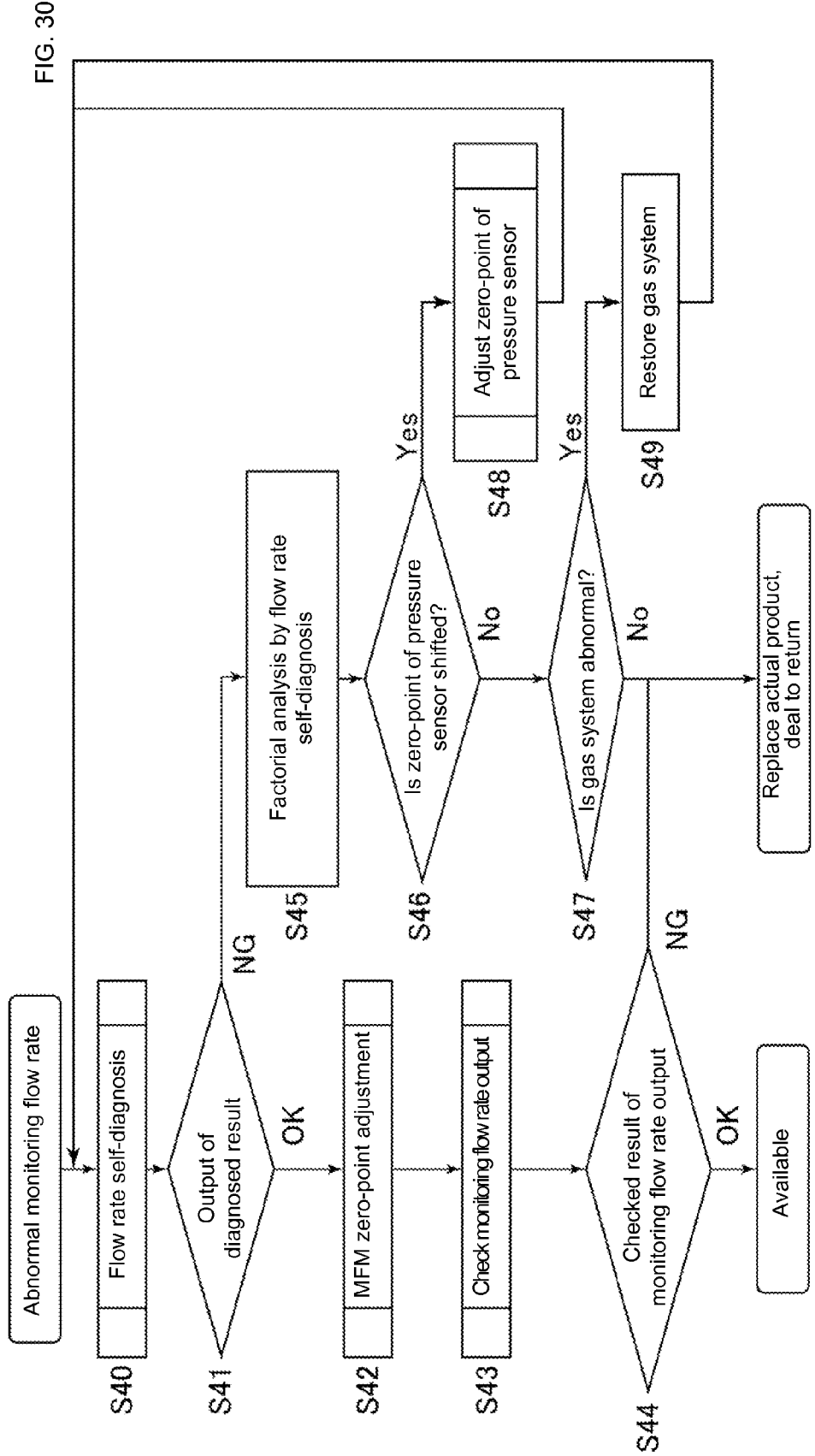
FIG. 30 is a flow diagram showing an example of a handling method when a monitoring flow rate of the pressure type flow control system with flow monitoring is abnormal.
Figure 31:
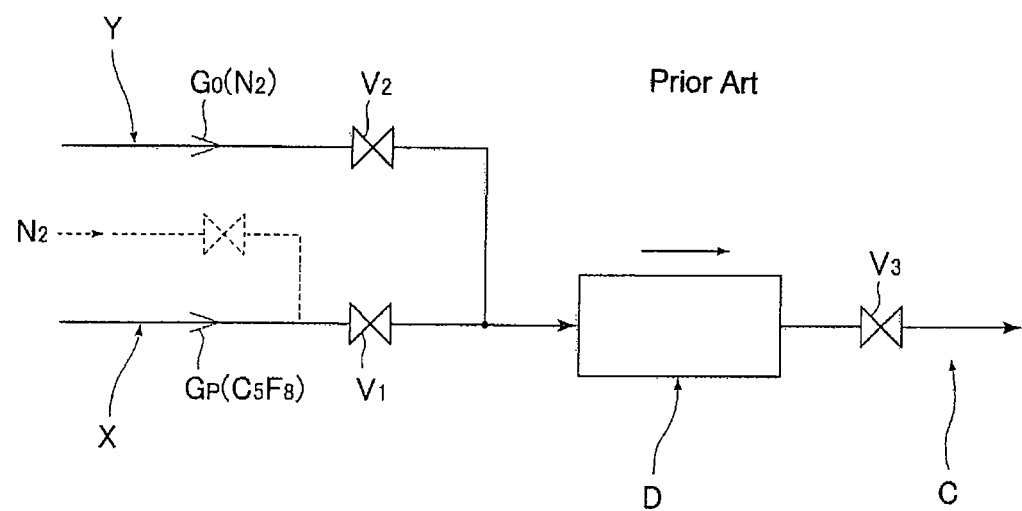
FIG. 31 is a schematic block configuration diagram showing an example of a fluid supply system equipped with a pressure type flow control system with flow monitoring in a semiconductor manufacturing facility.

Therefore, in accordance with the present invention, when an anomaly in monitoring flow rate appears, first, as shown by the algorithm diagram of FIG. 30, a flow rate self-diagnosis of the pressure type flow control system 1 with flow monitoring is performed (Step 40). In addition, the method of flow rate self-diagnosis is the same as the method described by FIG. 20, and the like. Furthermore, it has become apparent that the anomaly in monitoring flow rate is generally caused by such anomalies as a shift in zero-point of the thermal type flow monitoring unit 1b shown in FIG. 1, a shift in zero-point of the pressure type flow control unit 1a, an anomaly in the fluid supply system, a fault of the pressure type flow control system 1 itself that is provided with flow monitoring, and the like.

A flow rate self-diagnosis is performed in Step 40 and a result thereof is diagnosed in Step 41, and when the result of the flow rate self-diagnosis is within a normal range determined in advance (i.e., OK), a zero-point adjustment of the thermal type flow sensor 2 is carried out in Step 42. Thereafter, a monitoring flow rate output is again checked in Step 43, and when the output of the flow rate is within the normal range determined in advance in Step 44, this is judged as usable (i.e., OK), which is continuously provided for use.

When the result of the flow rate self-diagnosis is out of the set range in Step 41 (i.e., a not good or "NG" determination is made), a cause of the anomaly in monitoring flow rate in the flow rate self-diagnosis is analyzed in Step 45, in order to understand and ascertain the cause of the anomaly in the monitoring flow rate.

The factorial analysis of the anomaly of the flow rate self-diagnosis is carried out is Step 45 according to the descriptions of FIG. 21 to FIG. 29, and it is judged or determined which type of the four types, Types 1 to 4, corresponds to the cause of the anomaly.

Furthermore, in the flow rate self-diagnosis of the pressure type flow control system with flow monitoring, in the case where it is judged or ascertained that the cause of the anomaly in flow rate is caused by a change in bore of the orifice according to a pattern of the pressure drop characteristic curve (i.e., in the case of Type 1 of FIG. 25(a) and Type 2 of FIG. 25(b)), an output value of the flow rate from the pressure type flow control system with flow monitoring may be calibrated so as to consider the monitoring flow rate as the correct value (i.e., the actual flow rate as determined by flow rate measurement). In addition, as a calibration method for the output value of the flow rate from the pressure type flow control system provided with flow monitoring, for example, a method for appropriately selecting about 5 to 10 points as flow rate detecting points is employed, in order to perform calibration by use of differences between the corresponding monitoring flow rate values at these respective points and the flow rate output value.

Next, first in Step 46, it is checked as to whether or not there is a shift in the zero-point of the pressure sensor, and when there is no shift in the zero-point of the pressure sensor, it is checked whether or not this corresponds to an anomaly in the fluid supply system in Step 47. In contrast, when it becomes apparent that there is a shift in the zero-point of the pressure sensor in Step 46, the zero-point of the pressure sensor is adjusted in Step 48 and, thereafter, the processing is again returned to Step 40, in order to execute another flow rate self-diagnosis.

In Step 47, is checked whether or not the cause of the anomaly corresponds to the anomaly in the fluid supply system, and in the case where this does not correspond to an anomaly in the fluid supply system, it is judged or determined that there is a cause of the anomaly in the monitoring flow rate in the pressure type flow control system itself that is provided with flow monitoring. When this judgment or determination is made, then handling of replacement and/or exchange of the pressure type flow control system with flow monitoring with a new pressure type flow control system with flow monitoring is carried out. Furthermore, in Step 47, in the case where it becomes apparent that the cause of the anomaly corresponds to an anomaly in the fluid supply system in Step 47, the fluid supply system is repaired or restored in Step 49, and, thereafter, the processing is again returned to Step 40, to execute another flow rate self-diagnosis.

INDUSTRIAL APPLICABILITY

The present invention is widely applicable not only to gas supplying facilities for semiconductor manufacturing equipment, but also generally to fluid supply facilities using pressure type flow control systems provided with flow monitors having pressure sensors in the chemical industry, the food industry, and the like. Thus, while making full use of the excellent flow control characteristics of a pressure type flow control system using an orifice, and with simple addition, it is possible to easily and precisely, and appropriately monitor a real flow rate of a controlled fluid in real time, and it is possible to precisely judge or ascertain, as a result of a flow rate self-diagnosis, whether an anomaly in the pressure type flow control system provided with flow monitoring is caused by the pressure type flow control system itself in order to conduct appropriate swift handling of the anomaly when a monitoring flow rate is abnormal. Thus, in accordance with the present invention, when broadly construed, a pressure type flow control system provided with flow monitoring is constructed to include an inlet side passage 8 for fluid, a control valve 3 comprising a pressure type flow control unit 1a that is connected to a downstream side of the inlet side passage 8, a thermal type flow sensor 2 that is connected to a downstream side of the control valve 3, an orifice 6 that is installed along the way of a fluid passage 10 communicatively connected to a downstream side of the thermal type flow sensor 2, a temperature sensor 4 that is provided near the fluid passage 10 between the control valve 3 and the orifice 6, a pressure sensor 5 that is provided for the fluid passage 10 between the control valve 3 and the orifice 6, an outlet side passage 9 that is communicatively connected to the orifice 6, and a control unit 7 that is comprised of a pressure type flow rate arithmetic and control unit 7a to which a pressure signal from the pressure sensor 5 and a temperature signal from the temperature sensor 4 are input, and computes a flow rate value Q of a fluid flowing through the orifice 6, and outputs a control signal Pd to a valve drive unit 3a for bringing the control valve 3 into an opening or closing action in a direction in which a difference between the computed flow rate value and a set flow rate value is decreased, and a flow sensor control unit 7b to which a flow rate signal 2c from the thermal type flow sensor 2 is input, and computes a flow rate of the fluid flowing through the orifice 6 according to the flow rate signal 2c, to indicate the actual flow rate.

DESCRIPTION OF REFERENCE SYMBOLS

Figure 6:
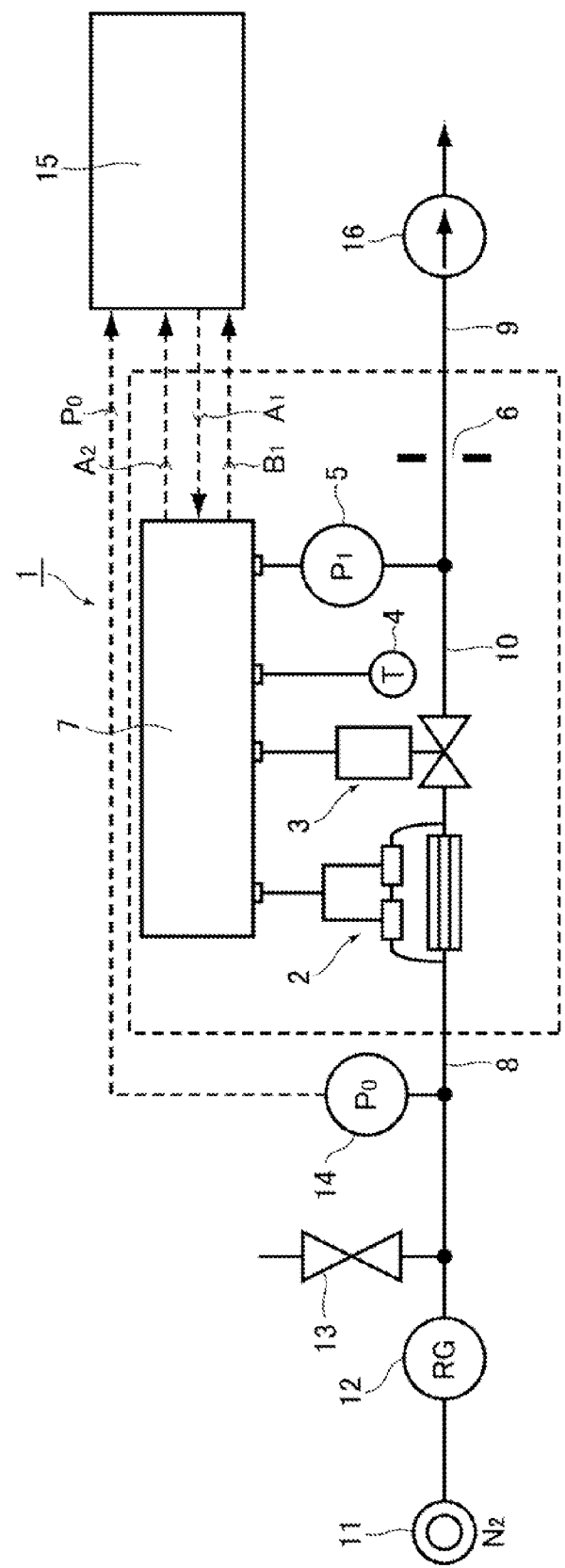
FIG. 6 is a first conception diagram of the pressure type flow control system with flow monitoring, which is conceived by the inventors of the present application.
Figure 7:
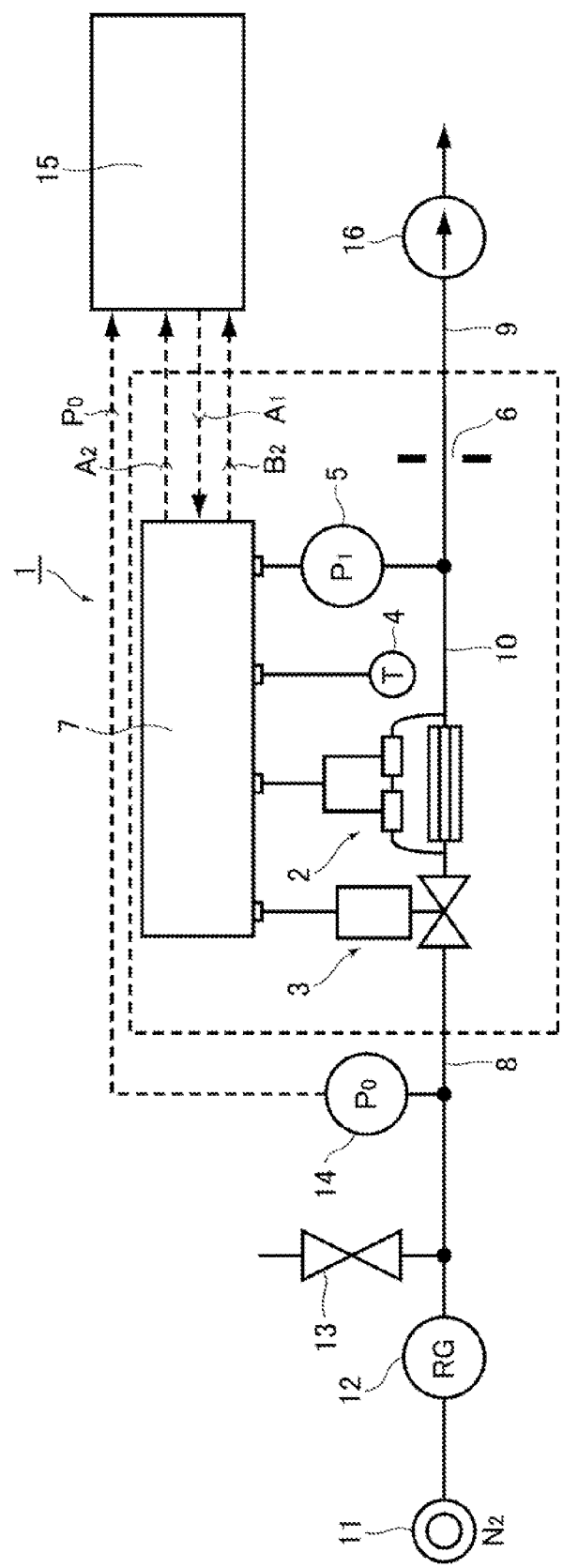
FIG. 7 is a second conception diagram of the pressure type flow control system with flow monitoring, which is conceived by the inventors of the present application.
Figure 8:
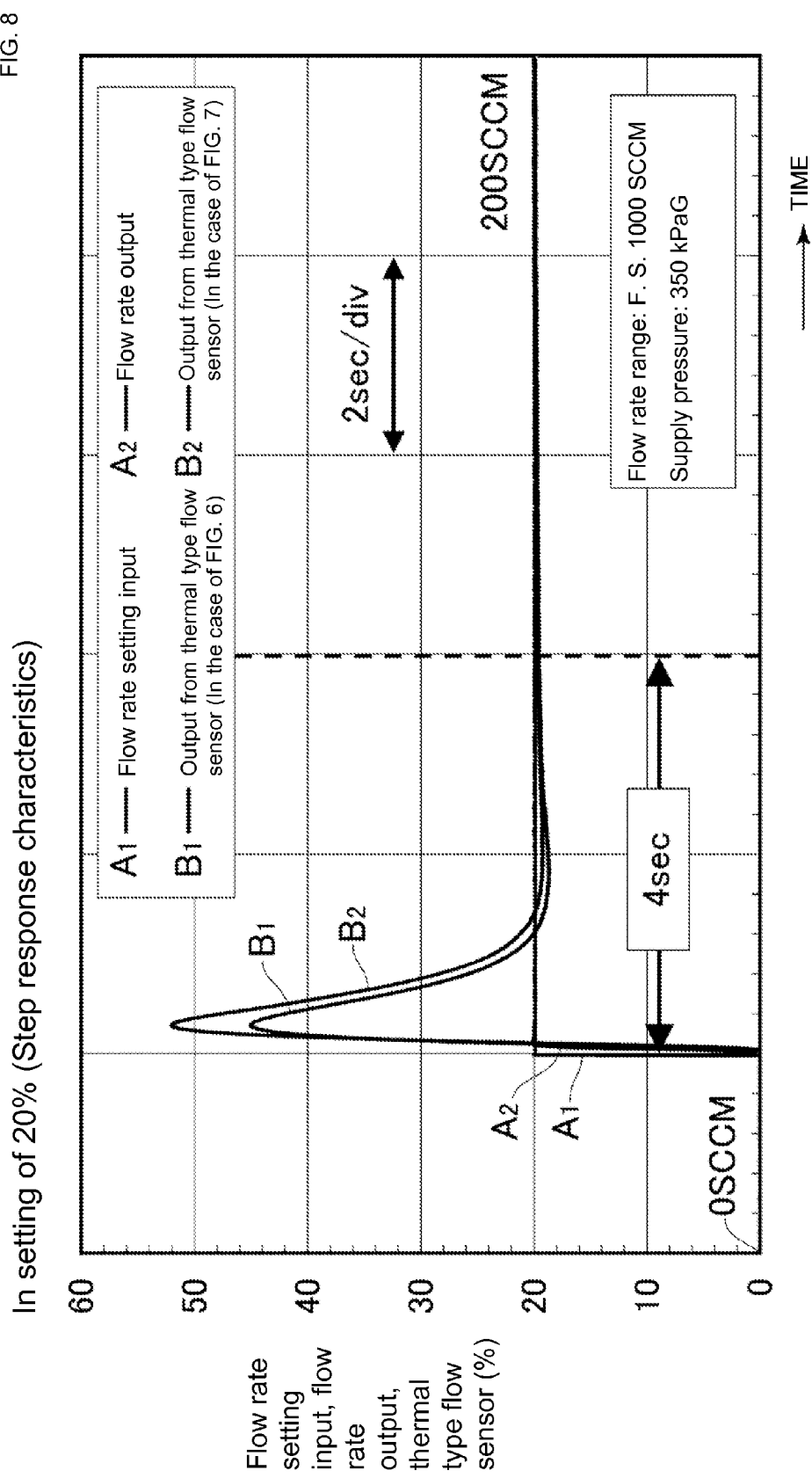
FIG. 8 shows curves of the step response characteristics of a thermal type flow sensor (in the case of a set flow rate of 20%).
Figure 9:
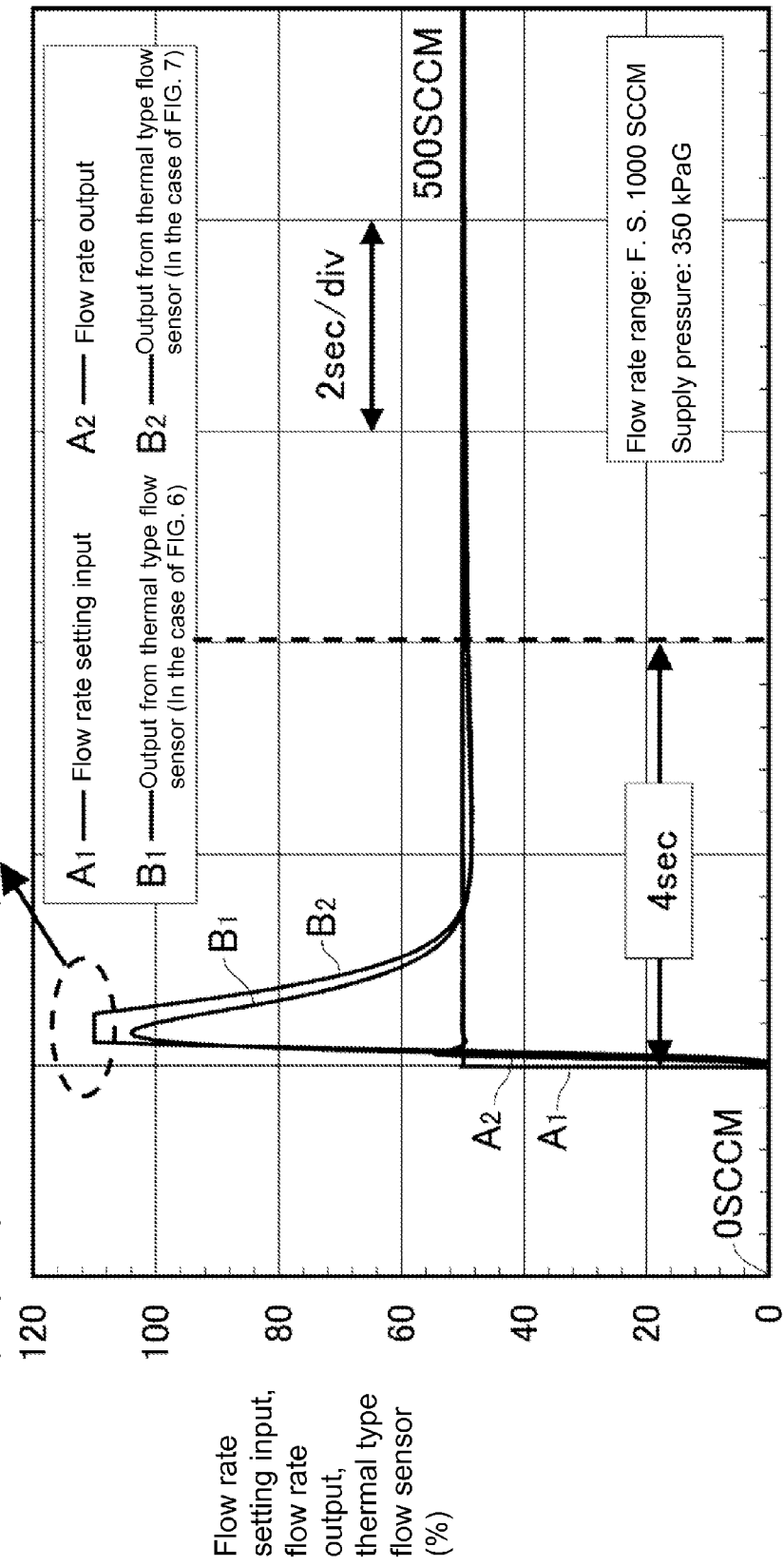
FIG. 9 shows curves of the step response characteristics of the thermal type flow sensor (in the case of a set flow rate of 50%).
Figure 10:
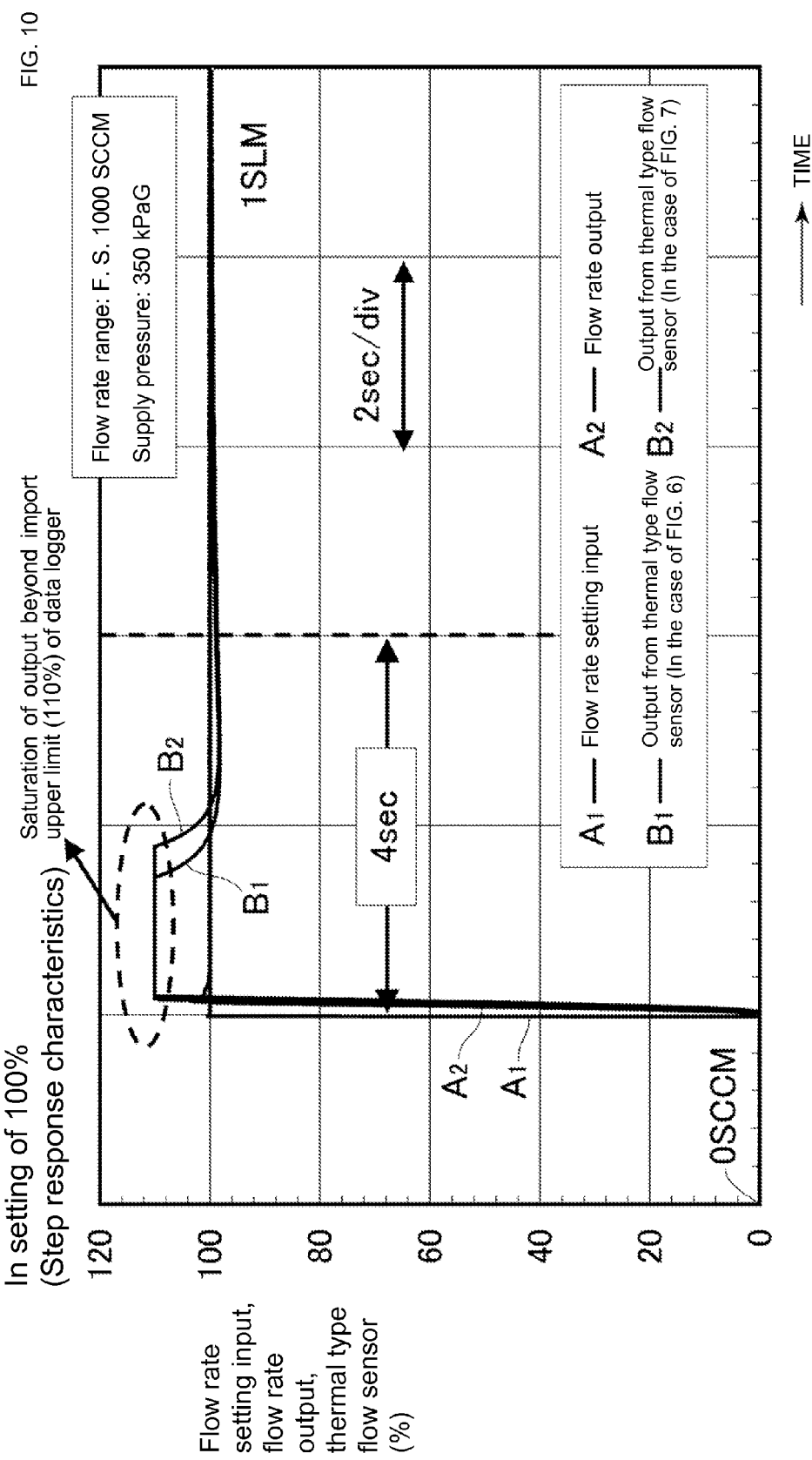
FIG. 10 shows curves of the step response characteristics of the thermal type flow sensor (in the case of a set flow rate of 10%).
Figure 11:
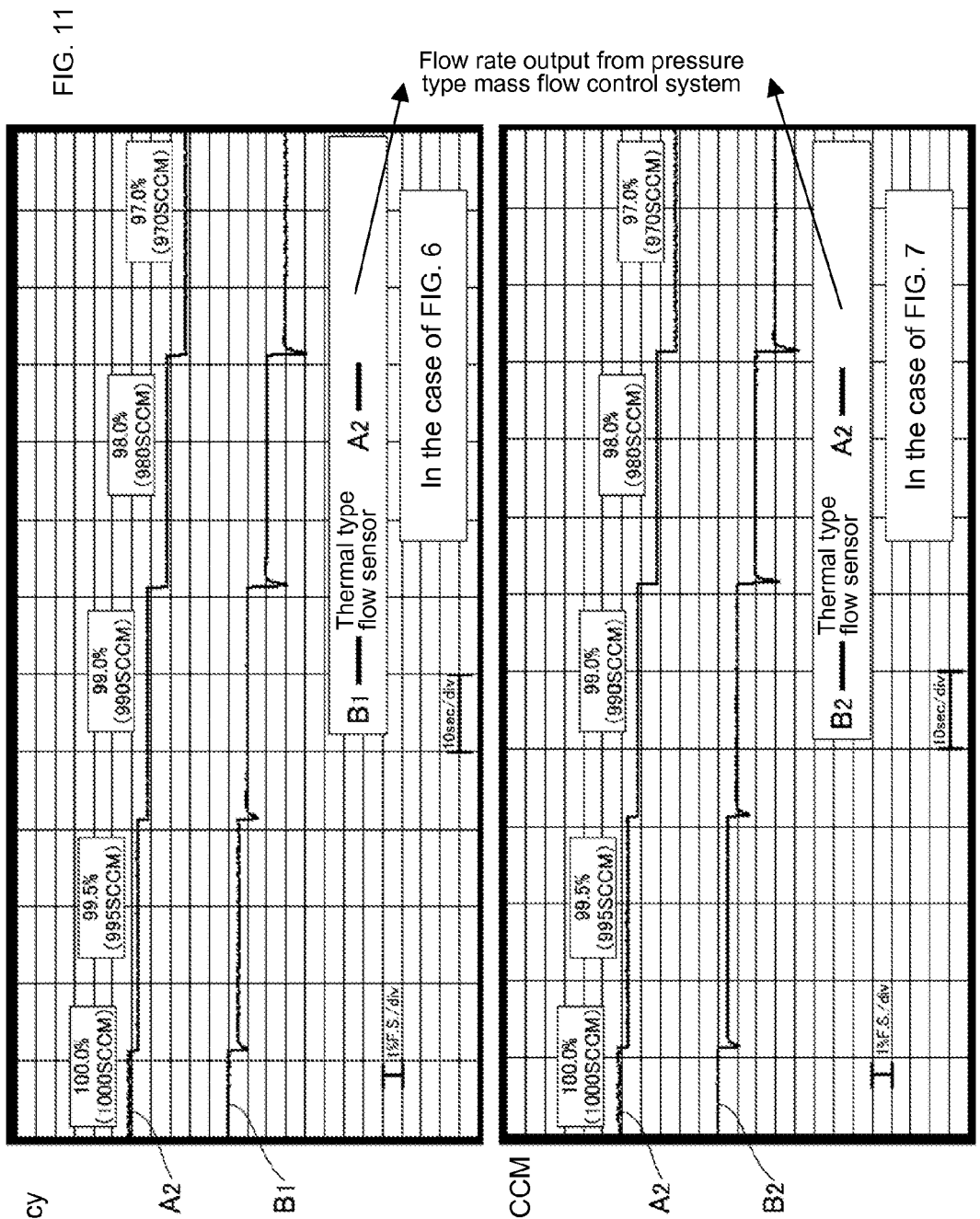
FIG. 11 shows curves of the monitoring flow rate accuracy characteristics of the thermal type flow sensor (in the case of a set flow rate of 100% to 97%).
Figure 12:
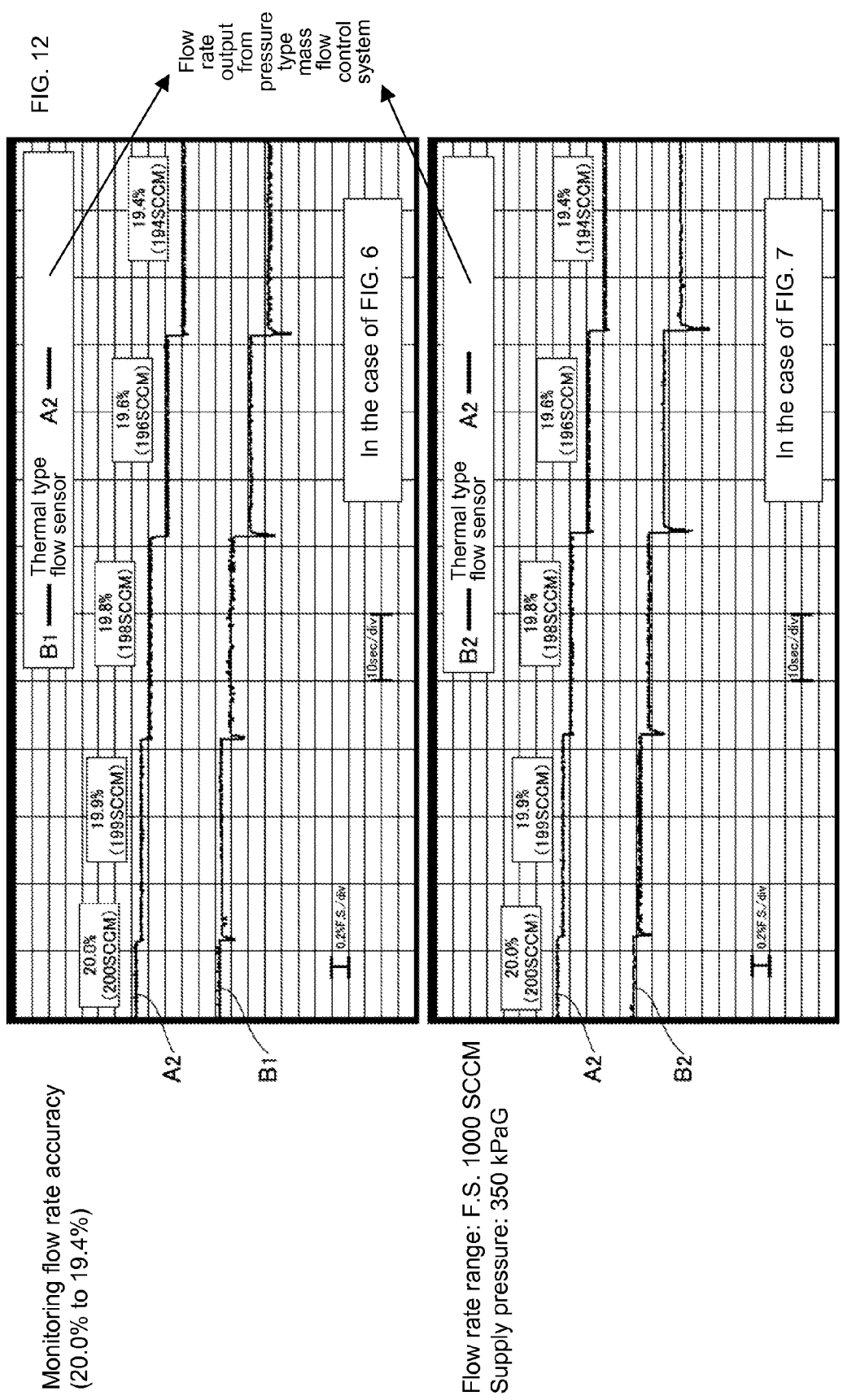
FIG. 12 shows curves of the monitoring flow rate accuracy characteristics of the thermal type flow sensor (in the case of a set flow rate of 20.0% to 19.4%).
Figure 13:
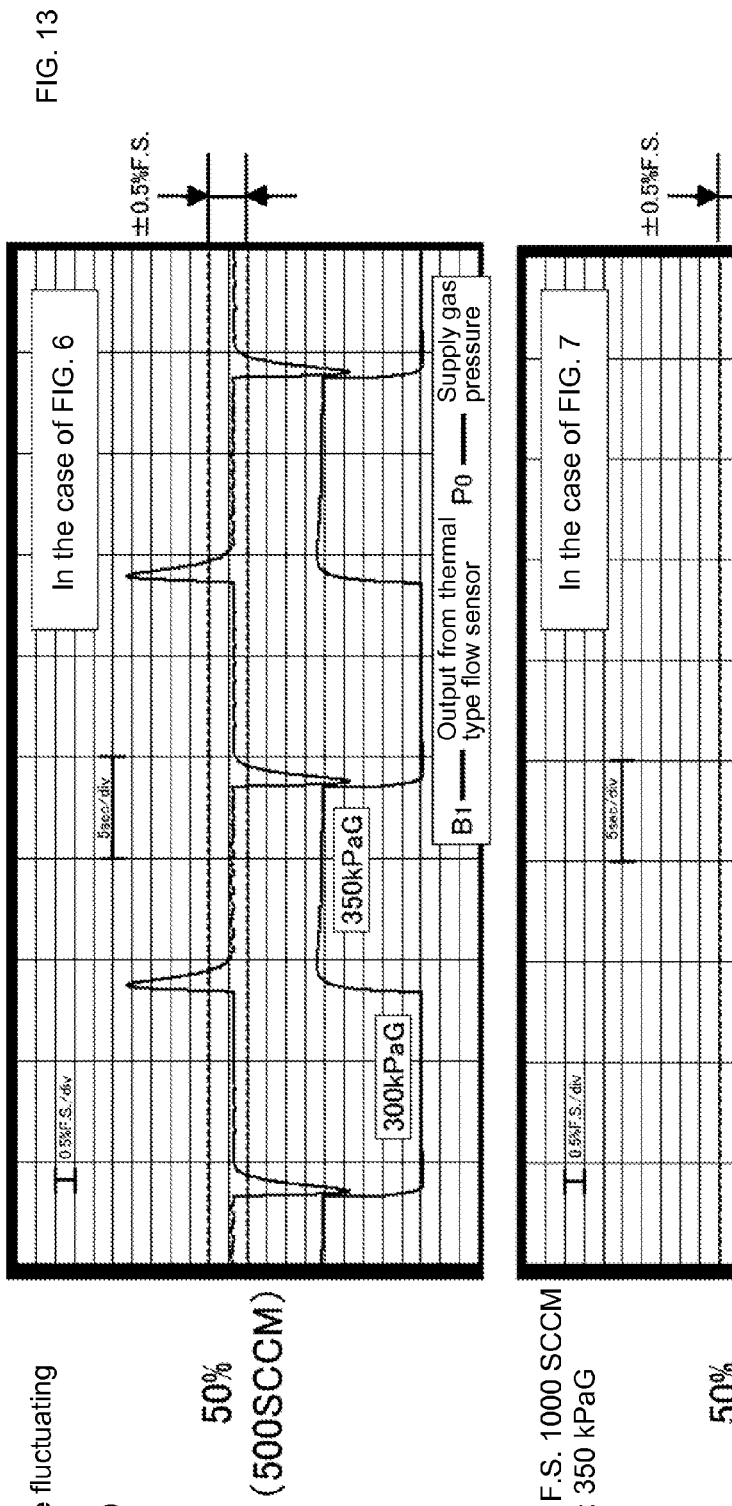
FIG. 13 shows curves of the supply pressure fluctuating characteristics of the thermal type flow sensor (in the case of a set flow rate of 50%).
Figure 14:
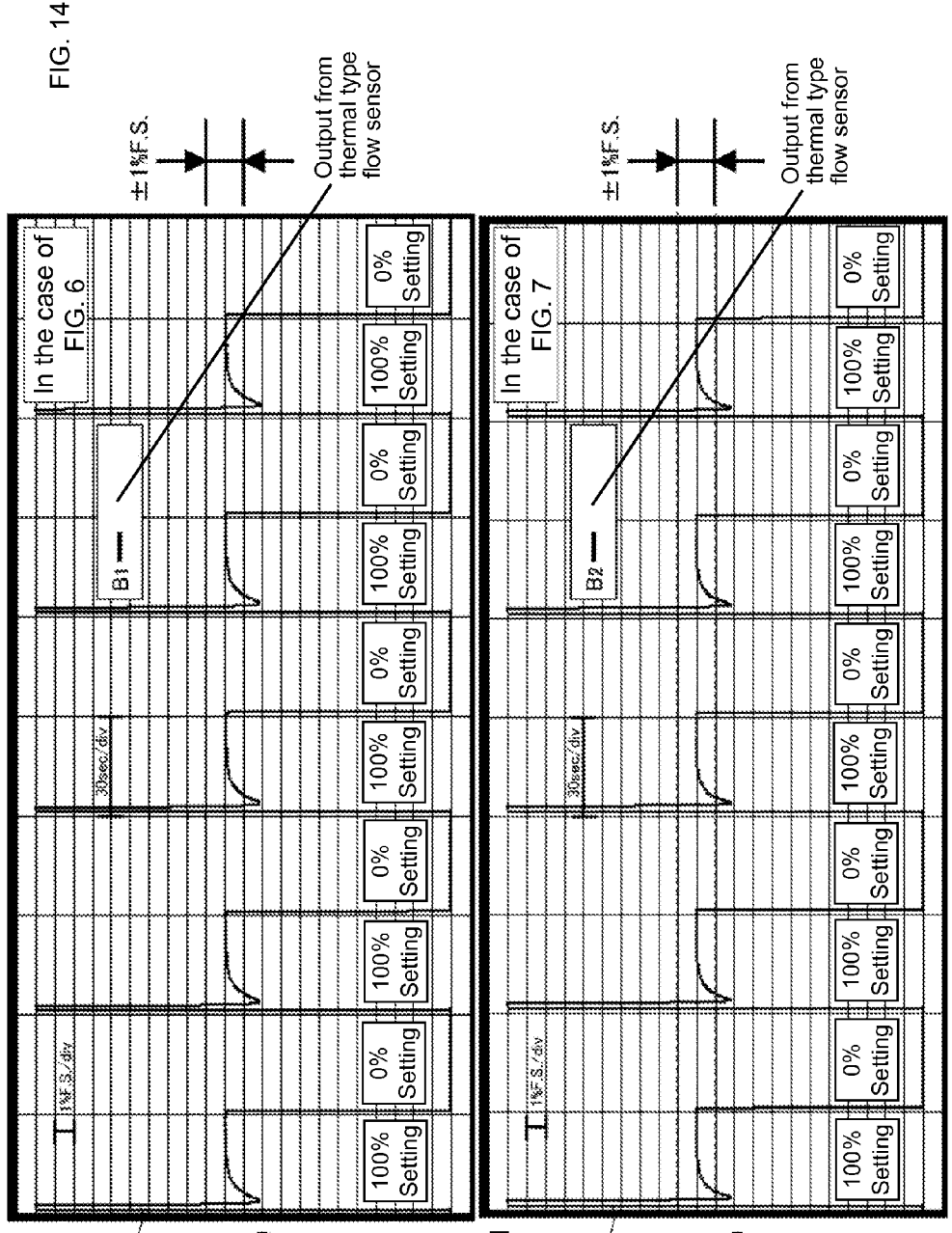
FIG. 14 shows curves of the repetitive reproducibility characteristics of the thermal type flow sensor (in the case of a set flow rate of 100%).
Figure 15:
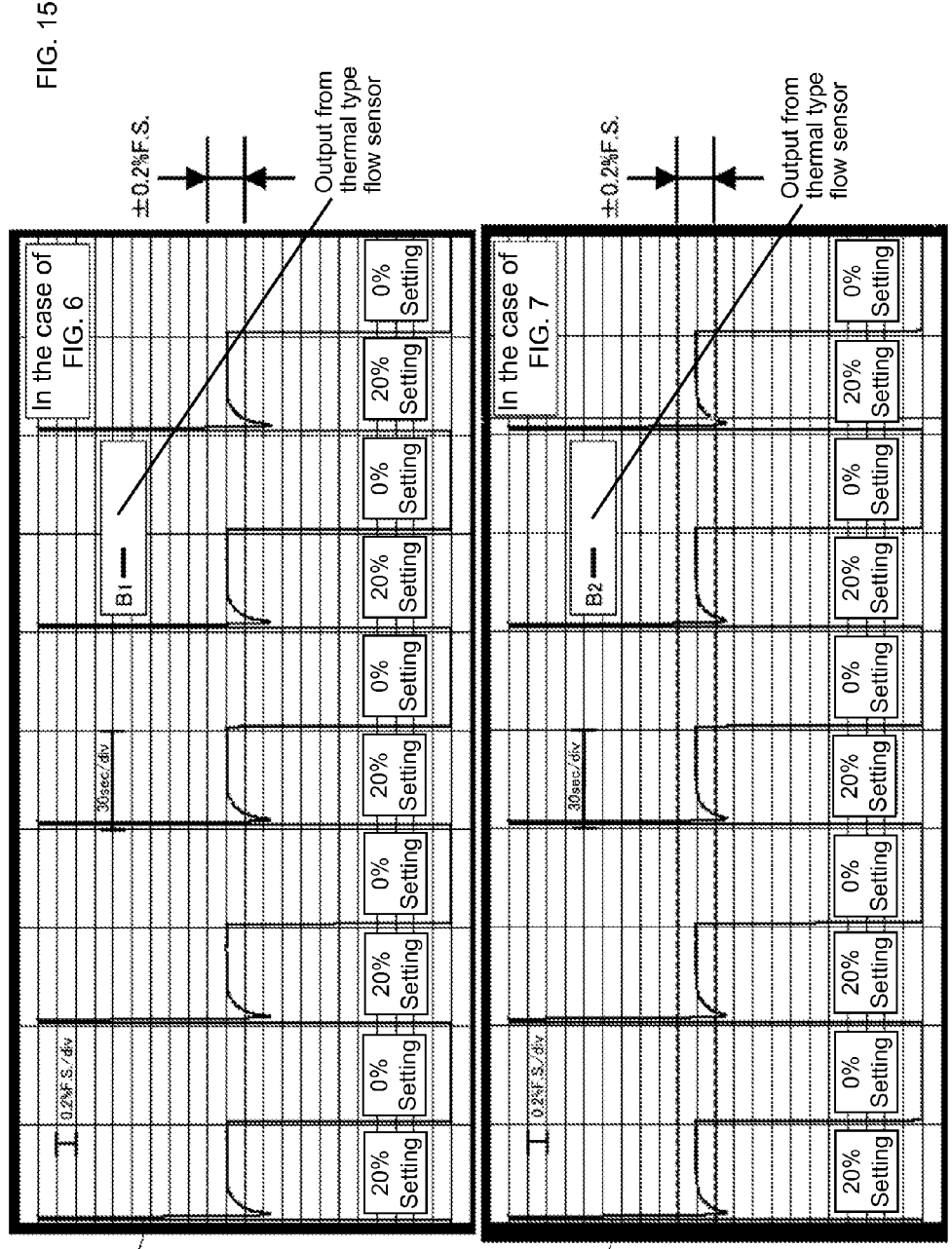
FIG. 15 shows curves of the repetitive reproducibility characteristics of the thermal type flow sensor (in the case of a set flow rate of 20%).

1: Pressure type flow control system with flow monitoring
1a: Pressure type flow control unit
1b: Thermal type flow monitoring unit
2: Thermal type flow sensor
2b: Sensor circuit
2d: Bypass pipe group
2e: Sensor pipe
3: Control valve
3a: Valve drive unit
4: Temperature sensor
5: Pressure sensor
6: Orifice
7: Control unit
7a: Pressure type flow rate arithmetic and control unit
7b: Flow sensor control unit
$7a_1$: Input terminal
$7a_2$: Output terminal
$7b_1$: Input terminal
$7b_2$: Output terminal
8: Inlet side passage
9: Outlet side passage
10: Fluid passage in device main body
11: Gas supply source
12: Pressure regulator
13: Purge valve
14: Input side pressure sensor
15: Data logger
16: Vacuum pump
17: Pressure sensor
Pd: Control valve control signal
Pc: Flow rate signal
$A_1$: Flow rate setting input
$A_2$: Flow rate output of pressure type flow control system
$B_1$: Output from thermal type flow sensor (FIG. 6: In the case of thermal type flow sensor on the primary side)
$B_2$: Output from thermal type flow sensor (FIG. 7: In the case of thermal type flow sensor on the secondary side)
X: Process gas supply system
$X_1$: Pipe
Y: Purge gas supply system
$Y_1$: Pipe
C: Process gas using system
E: Process chamber
FCS: Pressure type flow control system
$V_1$ to $V_3$: Valve
Go: Purge gas
Gp: Process gas

What is claimed is:

1. A pressure type flow control system with flow monitoring, comprising:
   (a) an inlet side passage for fluid;
   (b) a control valve and a valve drive unit of a pressure type flow control unit that is connected to a downstream side of the inlet side passage;
   (c) a thermal type flow sensor that is connected to a downstream side of the control valve;
   (d) an orifice that is installed on a first fluid passage communicatively connected to a downstream side of the thermal type flow sensor;
   (e) a temperature sensor that is provided near the first fluid passage between the control valve and the orifice to measure temperature of fluid in the first fluid passage;
   (f) a pressure sensor that is provided for the first fluid passage between the control valve and the orifice to measure pressure of fluid in the first fluid passage;
   (g) an outlet side passage that is communicatively connected to the orifice; and
   (h) a first control unit comprising
      (i) a pressure type flow rate arithmetic and control unit to which a pressure signal from the pressure sensor and a temperature signal from the temperature sensor are input, and the pressure type flow rate arithmetic and control unit computes a first flow rate value Q of fluid flowing through the orifice based on the input pressure signal, and the pressure type flow rate arithmetic and control unit outputs a control signal Pd for performing a feedback control to the valve drive unit that brings the control valve into an opening or closing action in a direction in which a difference between the computed first flow rate value and a set flow rate value is decreased; and
      (ii) a flow sensor control unit to which a flow rate signal from the thermal type flow sensor is input, and the flow sensor control unit computes a second flow rate of the fluid flowing through the orifice according to the flow rate signal to indicate an actual flow rate of the fluid flowing through the orifice,
   wherein, when a difference between the first flow rate of the fluid computed by the flow sensor control unit and the second flow rate of the fluid computed by the pressure type flow rate arithmetic and control unit exceeds a set value, then the first control unit performs an alarm indication;
   wherein the control valve is a nearest control valve to the orifice on an upstream side, and there are no other control valves between the control valve and the orifice.

2. The pressure type flow control system with flow monitoring according to claim 1, wherein the pressure sensor is provided between an outlet side of the control valve and an inlet side of the thermal type flow sensor.

3. The pressure type flow control system with flow monitoring according to claim 2, wherein when a difference between the first flow rate of the fluid computed by the flow sensor control unit and the second flow rate of the fluid computed by the pressure type flow rate arithmetic and control unit exceeds a set value, then the first control unit performs an alarm indication.

4. The pressure type flow control system with flow monitoring according to claim 1, wherein the control valve, the thermal type flow sensor, the orifice, the pressure sensor, the temperature sensor, the inlet side passage, and the outlet side passage, are integrally assembled in one body, and the first fluid passage is integrally formed in the one body.

5. The pressure type flow control system with flow monitoring according to claim 1, wherein the pressure sensor is provided between the thermal flow type sensor and the orifice.

6. A pressure type flow control system with flow monitoring, comprising:
   (a) an inlet side passage for fluid;
   (b) a control valve and a valve drive unit of a pressure type flow control unit that is connected to a downstream side of the inlet side passage;
   (c) a thermal type flow sensor that is connected to a downstream side of the control valve;
   (d) an orifice that is installed on a first fluid passage communicatively connected to a downstream side of the thermal type flow sensor;
   (e) a temperature sensor that is provided near the first fluid passage between the control valve and the orifice to measure temperature of fluid in the first fluid passage;
   (f) a first pressure sensor that is provided for the first fluid passage between the control valve and the orifice to measure pressure of fluid in the first fluid passage;
   (g) an outlet side passage that is communicatively connected to the orifice; and
   (h) a control unit comprising
      (i) a pressure type flow rate arithmetic and control unit to which pressure signals from the first pressure sensor and a temperature signal from the temperature sensor are input, and the pressure type flow rate arithmetic and control unit monitors critical expansions conditions of fluid flowing through the orifice and computes a first flow rate value Q of the fluid flowing through the orifice based on the input pressure signal, and the pressure type flow rate arithmetic and control unit outputs a control signal Pd for performing a feedback control to the valve drive unit that brings the control valve into an opening or closing action in a direction in which a difference between the computed first flow rate value and a set flow rate value is decreased; and
      (ii) a flow sensor control unit to which a flow rate signal from the thermal type flow sensor is input, and the flow sensor control unit computes a second flow rate of the fluid flowing through the orifice according to the flow rate signal to indicate an actual flow rate of the fluid flowing through the orifice,
   wherein, when a difference between the first flow rate of the fluid computed by the flow sensor control unit and the second flow rate of the fluid computed by the pressure type flow rate arithmetic and control unit exceeds a set value, then the first control unit performs an alarm indication;
   wherein the control valve is a nearest control valve to the orifice on an upstream side, and there are on other control valves between the control valve and the orifice.

7. The pressure type flow control system with flow monitoring according to claim 6, wherein the first control unit performs an alarm indication when the fluid flowing through the orifice is out of the critical expansion conditions.

8. The pressure type flow control system with flow monitoring according to claim 6, wherein the control valve, the thermal type flow sensor, the orifice, the first pressure sensor, the temperature sensor, the inlet side passage, and the outlet side passage, are integrally assembled in one body, and the first fluid passage is integrally formed in the one body.

9. The pressure type flow control system with flow monitoring according to claim 6, wherein a second pressure sensor is provided for the outlet side passage on the downstream side of the orifice to measure pressure of fluid on the downstream side of the orifice, and wherein the control unit further comprises the second pressure sensor.

10. The pressure type flow control system with flow monitoring according to claim 9, wherein the control valve, the thermal type flow sensor, the orifice, the first pressure sensor, the temperature sensor, the inlet side passage, the outlet side passage, and the second pressure sensor, are integrally assembled in one body, and the first fluid passage is integrally formed in the one body.

11. The pressure type flow control system with flow monitoring according to claim 6, wherein the pressure sensor is provided between the thermal flow type sensor and the orifice.

* * * * *